United States Patent
Shetty et al.

(10) Patent No.: US 12,236,422 B2
(45) Date of Patent: Feb. 25, 2025

(54) COMPUTER-IMPLEMENTED METHODS AND SYSTEMS FOR AUTHENTIC USER-MERCHANT ASSOCIATION AND SERVICES

(71) Applicant: Mastercard International Incorporated, Purchase, NY (US)

(72) Inventors: Kaushal Naveen Shetty, Thane (IN); Sachin Kumar Singh, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 36 days.

(21) Appl. No.: 17/569,294

(22) Filed: Jan. 5, 2022

(65) Prior Publication Data
US 2023/0214822 A1 Jul. 6, 2023

(51) Int. Cl.
*G06Q 20/38* (2012.01)
*G06Q 20/40* (2012.01)
*G06Q 30/018* (2023.01)
*H04L 9/40* (2022.01)

(52) U.S. Cl.
CPC ... *G06Q 20/38215* (2013.01); *G06Q 20/4016* (2013.01); *G06Q 30/0185* (2013.01); *H04L 63/0823* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 4,093,276 A | * | 6/1978 | Debe | B42D 25/29 283/117 |
| 4,205,852 A | * | 6/1980 | Wayman | A63F 3/0423 273/272 |
| 4,299,578 A | * | 11/1981 | Wayman | A63F 3/0423 273/272 |
| 4,306,724 A | * | 12/1981 | Brzezinski | A63F 3/0423 273/272 |

(Continued)

OTHER PUBLICATIONS

Bujlow "A Survey on Web Tracking: Mechanisms, Implications and Defenses," Proceedings of the IEEE, vol. 105, No. 8, pp. 1476-1510 (Year: 2017).*

(Continued)

*Primary Examiner* — Luu T Pham
*Assistant Examiner* — James J Wilcox
(74) *Attorney, Agent, or Firm* — Hovey Williams LLP

(57) ABSTRACT

A system for identifying genuine user-merchant association. The system includes one or more processors and/or transceivers individually or collectively programmed to check the validity or expiration of a certificate from a device from which a request originates to create a certificate score, analyze previous communication from the device from which the request originates across a plurality of entities and regions to create a previous communication score, and conduct a messaging protocol check to create a protocol score. The one or more processors and/or transceivers are also programmed to output a weighted final score comprising a determination of whether to accept or deny the request based at least in part on one or more of the certificate scores, the previous communication score, or the protocol score. The one or more processors and/or transceivers are also programmed to save the weighted final score.

18 Claims, 5 Drawing Sheets

(56) References Cited

U.S. PATENT DOCUMENTS

| | | | | |
|---|---|---|---|---|
| 5,143,378 A * | 9/1992 | Joel | A63F 3/0478 | 257/714 |
| 5,215,309 A * | 6/1993 | Joel | A63F 3/0478 | 273/243 |
| 6,058,484 A * | 5/2000 | Chapman | G06F 21/33 | 726/10 |
| 6,119,103 A * | 9/2000 | Basch | G06Q 20/4037 | 705/35 |
| 6,311,214 B1 * | 10/2001 | Rhoads | H04N 1/32288 | 380/255 |
| 6,418,436 B1 * | 7/2002 | Degen | G06Q 20/4016 | |
| 6,473,794 B1 * | 10/2002 | Guheen | H04L 43/50 | 709/224 |
| 6,536,037 B1 * | 3/2003 | Guheen | G06F 8/71 | 703/2 |
| 6,606,744 B1 * | 8/2003 | Mikurak | H04L 9/40 | 717/174 |
| 6,615,166 B1 * | 9/2003 | Guheen | G06Q 10/06 | 703/27 |
| 6,650,761 B1 * | 11/2003 | Rodriguez | H04N 1/32288 | 709/217 |
| 6,671,818 B1 * | 12/2003 | Mikurak | H04L 63/08 | 714/48 |
| 6,721,713 B1 * | 4/2004 | Guheen | G06Q 99/00 | 715/202 |
| 6,751,734 B1 * | 6/2004 | Uchida | G06F 21/32 | 713/168 |
| 6,835,135 B1 * | 12/2004 | Silverbrook | G06F 1/1632 | 463/30 |
| 6,850,252 B1 * | 2/2005 | Hoffberg | H04N 21/475 | 380/252 |
| 6,941,285 B2 * | 9/2005 | Sarcanin | G06Q 20/105 | 235/382 |
| 6,957,186 B1 * | 10/2005 | Guheen | G06Q 90/20 | 705/323 |
| 7,031,945 B1 * | 4/2006 | Donner | G06Q 20/382 | 340/4.62 |
| 7,124,101 B1 * | 10/2006 | Mikurak | G06Q 10/0631 | 705/7.12 |
| 7,165,041 B1 * | 1/2007 | Guheen | G06Q 30/0601 | 705/26.1 |
| 7,216,109 B1 * | 5/2007 | Donner | G06Q 20/382 | 235/382 |
| 7,315,826 B1 * | 1/2008 | Guheen | G06Q 30/0201 | 705/7.29 |
| 7,337,119 B1 * | 2/2008 | Geschwender | G06Q 40/00 | 705/44 |
| 7,386,517 B1 * | 6/2008 | Donner | G06Q 30/0277 | 705/72 |
| 7,617,136 B1 * | 11/2009 | Lessing | G06Q 20/203 | 705/28 |
| 7,716,077 B1 * | 5/2010 | Mikurak | G06Q 10/0631 | 705/7.12 |
| 7,959,074 B1 * | 6/2011 | Chopra | G06Q 20/405 | 235/472.01 |
| 8,020,763 B1 * | 9/2011 | Kowalchyk | G06Q 30/06 | 705/40 |
| 8,027,930 B2 * | 9/2011 | Smith | G06Q 10/10 | 705/317 |
| 8,032,409 B1 * | 10/2011 | Mikurak | G06Q 30/00 | 705/14.39 |
| 8,050,983 B1 * | 11/2011 | Eakin | G06Q 20/4016 | 705/26.35 |
| 8,086,533 B1 * | 12/2011 | Maglaque | G06Q 20/40 | 705/44 |
| 8,121,874 B1 * | 2/2012 | Guheen | G06Q 10/087 | 705/28 |
| 8,234,494 B1 * | 7/2012 | Bansal | G10L 15/02 | 713/176 |
| 8,297,501 B1 * | 10/2012 | Kowalchyk | G06Q 20/4016 | 705/40 |
| 8,327,131 B1 * | 12/2012 | Hardjono | H04L 63/1433 | 713/181 |
| 8,346,672 B1 * | 1/2013 | Weiner | G06Q 20/425 | 705/64 |
| 8,370,313 B2 * | 2/2013 | Snow | G06F 16/951 | 707/694 |
| 8,380,709 B1 * | 2/2013 | Diller | G06F 16/24578 | 707/723 |
| 8,504,309 B1 * | 8/2013 | Spoor | G06T 7/0004 | 702/34 |
| 8,639,629 B1 * | 1/2014 | Hoffman | G06Q 20/3821 | 705/64 |
| 8,768,838 B1 * | 7/2014 | Hoffman | G06Q 40/00 | 705/72 |
| 8,788,407 B1 * | 7/2014 | Singh | G06F 16/24578 | 705/38 |
| 8,965,796 B1 * | 2/2015 | Gala | G06Q 20/203 | 705/28 |
| 8,984,640 B1 * | 3/2015 | Emigh | H04L 51/212 | 726/13 |
| 9,037,499 B2 * | 5/2015 | Singhal | G07F 7/1008 | 705/26.42 |
| 9,189,788 B1 * | 11/2015 | Robinson | G06Q 20/40145 | |
| 9,246,923 B1 * | 1/2016 | Terribilini | G06Q 20/4016 | |
| 9,342,831 B1 * | 5/2016 | Davis | G06Q 20/40 | |
| 9,367,844 B1 * | 6/2016 | Hu | G06Q 20/4016 | |
| 9,547,870 B1 * | 1/2017 | Bradford | G06Q 30/0256 | |
| 9,875,347 B2 * | 1/2018 | Baghdasaryan | G06F 21/316 | |
| 9,888,037 B1 * | 2/2018 | Sharifi Mehr | H04L 63/205 | |
| 9,898,739 B2 * | 2/2018 | Monastyrsky | G06F 21/10 | |
| 9,912,486 B1 * | 3/2018 | Sharifi Mehr | H04L 9/3265 | |
| 9,961,077 B2 * | 5/2018 | Lindemann | H04L 9/3231 | |
| 9,978,067 B1 * | 5/2018 | Sadaghiani | H04L 63/1416 | |
| 10,007,900 B2 * | 6/2018 | Royyuru | G06Q 20/20 | |
| 10,169,746 B2 * | 1/2019 | Atwal | G06Q 20/14 | |
| 10,282,533 B2 * | 5/2019 | Lindemann | G06Q 20/3278 | |
| 10,282,728 B2 * | 5/2019 | Avegliano | G06Q 20/322 | |
| 10,334,062 B2 * | 6/2019 | Benson | H04L 63/08 | |
| 10,380,703 B2 * | 8/2019 | Chrapko | G06Q 20/384 | |
| 10,410,220 B2 * | 9/2019 | Miltonberger | G06Q 40/02 | |
| 10,438,176 B2 * | 10/2019 | Johnson | G06Q 20/20 | |
| 10,438,202 B2 * | 10/2019 | Neighman | G06Q 20/4012 | |
| 10,438,205 B2 * | 10/2019 | Van Os | G06Q 20/3278 | |
| 10,447,682 B1 * | 10/2019 | Du Lac | H04L 9/3247 | |
| 10,453,011 B1 * | 10/2019 | Briggs | G06Q 10/063114 | |
| 10,454,689 B1 * | 10/2019 | Sharifi Mehr | H04L 63/166 | |
| 10,467,122 B1 * | 11/2019 | Doyle | G06Q 20/207 | |
| 10,469,504 B1 * | 11/2019 | Dandekar | H04L 63/105 | |
| 10,475,025 B2 * | 11/2019 | Zarakas | G06Q 20/3672 | |
| 10,510,057 B2 * | 12/2019 | Priebatsch | G06Q 20/3672 | |
| 10,567,402 B1 * | 2/2020 | Comeaux | G06N 5/01 | |
| 10,586,227 B2 * | 3/2020 | Makhdumi | G06Q 20/3276 | |
| 10,592,882 B1 * | 3/2020 | Viswanath | G06Q 20/3223 | |
| 10,628,827 B1 * | 4/2020 | Gailloux | G06Q 20/32 | |
| 10,636,019 B1 * | 4/2020 | Abrons | G06Q 30/0207 | |
| 10,650,332 B1 * | 5/2020 | Sinha | G06Q 10/063 | |
| 10,652,030 B1 * | 5/2020 | Levy | H04L 9/3268 | |
| 10,708,256 B1 * | 7/2020 | Kane-Parry | H04L 63/0823 | |
| 10,726,440 B1 * | 7/2020 | Bradford | G06Q 40/02 | |
| 10,755,273 B2 * | 8/2020 | Groarke | G06Q 20/40 | |
| 10,769,635 B2 * | 9/2020 | Lindemann | H04L 63/0861 | |
| 10,789,594 B2 * | 9/2020 | Moshir | G06Q 20/4016 | |
| 10,796,294 B2 * | 10/2020 | Van Os | G06Q 20/3221 | |
| 10,796,363 B1 * | 10/2020 | Kim | G06Q 40/03 | |
| 10,810,290 B2 * | 10/2020 | Minter | G06F 21/64 | |
| 10,825,012 B1 * | 11/2020 | Senci | G06N 20/00 | |
| 10,853,895 B1 * | 12/2020 | O'Neal | G06Q 30/0627 | |
| 10,902,705 B1 * | 1/2021 | Rose | H04L 63/0823 | |
| 10,949,918 B2 * | 3/2021 | Fidanza | G06Q 20/405 | |
| 10,956,916 B1 * | 3/2021 | Abreu | G06F 16/285 | |
| 11,037,129 B1 * | 6/2021 | Chen | G06Q 20/3224 | |
| 11,063,745 B1 * | 7/2021 | Du | H04L 9/0825 | |
| 11,068,898 B2 * | 7/2021 | Allen | G06Q 20/351 | |
| 11,089,160 B1 * | 8/2021 | Chen | G06Q 20/325 | |
| 11,113,665 B1 * | 9/2021 | Rose | G06Q 20/4014 | |
| 11,113,712 B2 * | 9/2021 | Hoque | G06Q 20/407 | |
| 11,132,686 B2 * | 9/2021 | Nightengale | G06Q 20/4016 | |
| 11,138,657 B1 * | 10/2021 | Boeder | G06Q 40/03 | |

(56) References Cited

U.S. PATENT DOCUMENTS

| | | | |
|---|---|---|---|
| 11,139,955 B1* | 10/2021 | So | G06Q 20/3674 |
| 11,144,957 B1* | 10/2021 | Raak | G06Q 30/0631 |
| 11,151,279 B1* | 10/2021 | Townsend, III | G06F 21/6227 |
| 11,164,163 B1* | 11/2021 | Viidu | G06Q 20/027 |
| 11,170,120 B1* | 11/2021 | Sampemane | G06Q 20/127 |
| 11,170,323 B2* | 11/2021 | Lowe | G06Q 50/14 |
| 11,170,377 B2* | 11/2021 | Green | G06Q 20/4016 |
| 11,176,533 B2* | 11/2021 | Maxwell | G06Q 30/0226 |
| 11,176,556 B2* | 11/2021 | Song | G06N 7/00 |
| 11,221,744 B2* | 1/2022 | Van Os | G06F 3/04842 |
| 11,227,325 B1* | 1/2022 | Baral | G06Q 20/3224 |
| 11,257,049 B1* | 2/2022 | Durazo Almeida | G06V 30/413 |
| 11,257,073 B2* | 2/2022 | Padmanabhan | H04L 9/50 |
| 11,257,123 B1* | 2/2022 | Bebawy | G06Q 20/40 |
| 11,263,603 B1* | 3/2022 | Dhodapkar | G06Q 20/20 |
| 11,269,627 B1* | 3/2022 | Kim | G06F 11/3442 |
| 11,270,312 B1* | 3/2022 | Jass | G06Q 30/0201 |
| 11,277,437 B1* | 3/2022 | Burgis | H04L 63/1408 |
| 11,282,087 B2* | 3/2022 | Henderson | G06Q 20/387 |
| 11,288,280 B2* | 3/2022 | Padmanabhan | H04L 9/3231 |
| 11,288,669 B1* | 3/2022 | Kim | G06N 20/00 |
| 11,314,998 B1* | 4/2022 | Sanderson | G06Q 20/3274 |
| 11,315,193 B1* | 4/2022 | Kim | G06Q 20/3678 |
| 11,321,709 B1* | 5/2022 | Kolchin | G06Q 20/108 |
| 11,321,718 B1* | 5/2022 | Narendranathan | G06F 21/64 |
| 11,321,726 B1* | 5/2022 | Pandhi | G06Q 10/1095 |
| 11,328,309 B1* | 5/2022 | Sahibzada | G06Q 20/34 |
| 11,334,883 B1* | 5/2022 | Auerbach | G06Q 20/223 |
| 11,341,523 B1* | 5/2022 | Jacoby | G06Q 20/20 |
| 11,354,668 B2* | 6/2022 | Senci | G06Q 20/12 |
| 11,423,373 B1* | 8/2022 | Book | G06Q 20/40 |
| 11,436,068 B2* | 9/2022 | Naidu | G06Q 20/4016 |
| 11,436,603 B2* | 9/2022 | Roche | G06Q 20/102 |
| 11,449,844 B1* | 9/2022 | Harris | G06Q 20/102 |
| 11,449,922 B2* | 9/2022 | Chacko | G06Q 20/405 |
| 11,456,882 B2* | 9/2022 | Kravitz | H04L 9/0819 |
| 11,461,815 B1* | 10/2022 | Durairaj | G06Q 20/326 |
| 11,470,074 B2* | 10/2022 | Lacey | H04L 63/10 |
| 11,475,489 B1* | 10/2022 | Schwarz, Jr. | G06F 21/64 |
| 11,522,700 B1* | 12/2022 | Auerbach | H04L 9/3213 |
| 11,526,934 B2* | 12/2022 | Rostami | G06Q 20/3676 |
| 11,545,245 B1* | 1/2023 | Dubey | G16H 20/10 |
| 11,564,266 B1* | 1/2023 | Kahn | H04W 76/10 |
| 11,567,852 B1* | 1/2023 | Tatum | G06F 11/302 |
| 11,593,743 B2* | 2/2023 | Makhija | G06F 9/54 |
| 11,610,204 B1* | 3/2023 | Osterkamp | G07C 9/37 |
| 11,610,207 B1* | 3/2023 | Chowdhury | G06Q 20/4016 |
| 11,657,399 B1* | 5/2023 | Sahni | H04W 12/06 705/44 |
| 11,663,675 B1* | 5/2023 | Estes | G06Q 10/06398 705/4 |
| 11,676,154 B2* | 6/2023 | Bungert | G06Q 20/4016 705/44 |
| 11,676,195 B1* | 6/2023 | Erickson | H04L 67/306 705/26.7 |
| 11,741,401 B2* | 8/2023 | Cella | G06F 9/5016 705/7.25 |
| 11,748,720 B2* | 9/2023 | Miller | G06Q 40/02 705/42 |
| 11,775,977 B1* | 10/2023 | Kruse | G06Q 20/4014 705/40 |
| 11,797,961 B2* | 10/2023 | Chen | G06F 16/9535 |
| 11,803,849 B1* | 10/2023 | Lawrence | G06Q 40/03 |
| 11,823,162 B2* | 11/2023 | Mayers | G06V 10/751 |
| 11,823,195 B2* | 11/2023 | Hayes, Jr. | G06Q 20/047 |
| 11,830,011 B2* | 11/2023 | Banipal | G06Q 10/0838 |
| 11,847,623 B1* | 12/2023 | Bowers | G06Q 20/4037 |
| 11,868,975 B1* | 1/2024 | Chapman | G06Q 20/401 |
| 11,868,995 B2* | 1/2024 | Lindemann | H04L 9/0877 |
| 11,869,006 B1* | 1/2024 | Rahimi | G06F 21/32 |
| 11,875,349 B2* | 1/2024 | Gosset | H04L 63/101 |
| 11,875,400 B2* | 1/2024 | Padmanabhan | G06F 16/27 |
| 11,876,910 B2* | 1/2024 | Padmanabhan | G06F 16/24573 |
| 11,899,817 B2* | 2/2024 | Padmanabhan | G06F 21/64 |
| 11,900,455 B1* | 2/2024 | Lawrence | G06N 5/02 |
| 11,909,860 B1* | 2/2024 | So | G06Q 40/06 |
| 11,922,495 B1* | 3/2024 | Hernandez | G06Q 40/03 |
| 11,979,521 B2* | 5/2024 | Steckel | H04L 51/21 |
| 12,002,055 B1* | 6/2024 | Miller | G06F 21/53 |
| 2001/0018660 A1* | 8/2001 | Sehr | G07F 7/02 705/41 |
| 2002/0034721 A1* | 3/2002 | McManus | G09B 5/06 434/350 |
| 2002/0038291 A1* | 3/2002 | Petersen | G06Q 20/3829 705/67 |
| 2002/0052782 A1* | 5/2002 | Landesmann | G06Q 30/0207 705/14.69 |
| 2002/0056050 A1* | 5/2002 | Heiden | G06Q 20/3821 379/207.15 |
| 2002/0082067 A1* | 6/2002 | Mckay | G09B 19/22 463/9 |
| 2002/0099649 A1* | 7/2002 | Lee | G06Q 20/4016 705/38 |
| 2002/0120846 A1* | 8/2002 | Stewart | G06Q 20/401 713/168 |
| 2002/0143692 A1* | 10/2002 | Heimermann | G06Q 30/06 705/26.1 |
| 2003/0003434 A1* | 1/2003 | Gruber | G09B 7/02 434/350 |
| 2003/0040957 A1* | 2/2003 | Rodriguez | G06K 7/1447 704/E19.009 |
| 2003/0077558 A1* | 4/2003 | Wood | G09B 5/02 434/322 |
| 2003/0104867 A1* | 6/2003 | Kobayashi | A63F 13/45 463/42 |
| 2003/0154406 A1* | 8/2003 | Honarvar | G07C 9/37 713/153 |
| 2003/0175677 A1* | 9/2003 | Kuntz | G09B 3/02 434/350 |
| 2004/0033834 A1* | 2/2004 | Silverbrook | H04M 1/21 463/43 |
| 2004/0064351 A1* | 4/2004 | Mikurak | G06Q 30/0269 705/22 |
| 2004/0122747 A1* | 6/2004 | Jimenez | G06Q 30/0635 705/26.1 |
| 2004/0128514 A1* | 7/2004 | Rhoads | G07F 7/086 704/E15.045 |
| 2004/0138975 A1* | 7/2004 | Engel | G06Q 20/042 705/35 |
| 2004/0150662 A1* | 8/2004 | Beigel | G09B 7/02 715/707 |
| 2004/0159212 A1* | 8/2004 | Terada | G06Q 20/382 84/477 R |
| 2004/0181665 A1* | 9/2004 | Houser | G06Q 40/02 713/158 |
| 2005/0013462 A1* | 1/2005 | Rhoads | G07F 17/16 707/E17.112 |
| 2005/0037326 A1* | 2/2005 | Kuntz | G09B 7/00 434/353 |
| 2005/0096143 A1* | 5/2005 | Anton | A63B 69/3691 473/169 |
| 2005/0111047 A1* | 5/2005 | Rhoads | G06K 19/14 707/E17.112 |
| 2005/0133588 A1* | 6/2005 | Williams | G06Q 20/20 235/379 |
| 2005/0137975 A1* | 6/2005 | Williams | G06Q 40/08 705/40 |
| 2005/0149438 A1* | 7/2005 | Williams | G07F 7/1008 705/40 |
| 2005/0177442 A1* | 8/2005 | Sullivan | G06Q 10/087 705/16 |
| 2006/0015722 A1* | 1/2006 | Rowan | H04L 63/0823 713/166 |
| 2006/0069697 A1* | 3/2006 | Shraim | H04L 63/1441 707/999.102 |
| 2006/0157559 A1* | 7/2006 | Levy | G06Q 20/40145 235/380 |
| 2006/0161435 A1* | 7/2006 | Atef | G06F 21/40 704/246 |

(56) References Cited

U.S. PATENT DOCUMENTS

| | | | |
|---|---|---|---|
| 2006/0178918 A1* | 8/2006 | Mikurak | G06Q 10/06 705/7.31 |
| 2006/0178984 A1* | 8/2006 | Anderson | G06Q 20/10 235/379 |
| 2006/0246901 A1* | 11/2006 | Sivakumar | H04W 36/0058 455/436 |
| 2006/0282309 A1* | 12/2006 | Zhang | G06Q 30/02 705/14.1 |
| 2006/0282660 A1* | 12/2006 | Varghese | G07F 7/1083 713/155 |
| 2007/0011032 A1* | 1/2007 | Bregante | G06Q 40/08 707/999.001 |
| 2007/0038568 A1* | 2/2007 | Greene | G06Q 40/08 705/50 |
| 2007/0061393 A1* | 3/2007 | Moore | H04L 67/02 709/201 |
| 2007/0105084 A1* | 5/2007 | Kuntz | G09B 7/02 434/350 |
| 2007/0106754 A1* | 5/2007 | Moore | G16H 40/20 707/E17.116 |
| 2007/0143629 A1* | 6/2007 | Hardjono | H04L 63/0823 713/181 |
| 2007/0168461 A1* | 7/2007 | Moore | G16H 10/60 709/217 |
| 2007/0169182 A1* | 7/2007 | Wolfond | G06F 21/31 726/7 |
| 2007/0174082 A1* | 7/2007 | Singh | H04W 4/02 705/44 |
| 2007/0196803 A1* | 8/2007 | Goodrich | G09B 5/00 434/323 |
| 2007/0265095 A1* | 11/2007 | Jonishi | A63F 13/332 463/42 |
| 2007/0288380 A1* | 12/2007 | Starrs | G06Q 20/042 705/45 |
| 2008/0040151 A1* | 2/2008 | Moore | G16H 40/67 705/2 |
| 2008/0060210 A1* | 3/2008 | Trout | G01B 3/12 33/773 |
| 2008/0082662 A1* | 4/2008 | Dandliker | H04L 63/10 709/225 |
| 2008/0109473 A1* | 5/2008 | Dixon | G06Q 10/06 707/999.102 |
| 2008/0125229 A1* | 5/2008 | Jonishi | A63F 13/332 463/36 |
| 2008/0147630 A1* | 6/2008 | Chu | G06F 16/2458 707/999.005 |
| 2008/0168274 A1* | 7/2008 | Natanzon | H04L 63/102 713/175 |
| 2008/0189164 A1* | 8/2008 | Wiseman | G06Q 20/40 705/26.1 |
| 2008/0208760 A1* | 8/2008 | Keithley | G06Q 20/40 705/75 |
| 2008/0238610 A1* | 10/2008 | Rosenberg | G06Q 30/0601 705/26.1 |
| 2008/0288324 A1* | 11/2008 | Graczynski | G06Q 10/063112 705/7.29 |
| 2008/0288405 A1* | 11/2008 | John | G06Q 20/384 705/44 |
| 2008/0306839 A1* | 12/2008 | Starrs | G06Q 20/403 705/27.1 |
| 2008/0319804 A1* | 12/2008 | Pulnikova | G06Q 10/02 707/999.102 |
| 2009/0024663 A1* | 1/2009 | McGovern | G06F 21/577 |
| 2009/0089860 A1* | 4/2009 | Forrester | H04L 9/0897 718/1 |
| 2009/0089869 A1* | 4/2009 | Varghese | G07F 7/1008 726/7 |
| 2009/0093300 A1* | 4/2009 | Lutnick | G07F 17/3293 463/31 |
| 2009/0106557 A1* | 4/2009 | Leonard | H04L 63/12 713/176 |
| 2009/0132689 A1* | 5/2009 | Zaltzman | G06Q 10/00 709/223 |
| 2009/0132813 A1* | 5/2009 | Schibuk | G06Q 20/4014 726/9 |
| 2009/0171756 A1* | 7/2009 | De Zilwa | G06Q 20/4016 705/38 |
| 2009/0222379 A1* | 9/2009 | Choudhuri | G06Q 20/10 705/38 |
| 2009/0234711 A1* | 9/2009 | Ramer | G06Q 30/0269 705/14.66 |
| 2009/0240568 A1* | 9/2009 | Ramer | G06F 16/68 705/35 |
| 2009/0254499 A1* | 10/2009 | Deyo | G06Q 10/10 706/12 |
| 2009/0254971 A1* | 10/2009 | Herz | G06Q 10/10 726/1 |
| 2009/0278841 A1* | 11/2009 | Hamilton, II | G06Q 30/0211 705/1.1 |
| 2009/0281743 A1* | 11/2009 | Hamilton, II | A63F 13/77 702/61 |
| 2010/0030578 A1* | 2/2010 | Siddique | H04W 4/00 705/26.1 |
| 2010/0031347 A1* | 2/2010 | Ohto | G06F 11/3485 726/19 |
| 2010/0048302 A1* | 2/2010 | Lutnick | G07F 17/3218 463/42 |
| 2010/0063877 A1* | 3/2010 | Soroca | G06Q 30/0247 705/14.46 |
| 2010/0076994 A1* | 3/2010 | Soroca | G06F 16/68 707/769 |
| 2010/0094878 A1* | 4/2010 | Soroca | G06Q 30/0267 707/812 |
| 2010/0125470 A1* | 5/2010 | Chisholm | G06Q 20/40 705/35 |
| 2010/0125523 A1* | 5/2010 | Solomon | G06Q 30/02 715/201 |
| 2010/0145777 A1* | 6/2010 | Ghosh | G06Q 90/00 705/14.1 |
| 2010/0153185 A1* | 6/2010 | Ghosh | G06Q 30/0283 705/400 |
| 2010/0153329 A1* | 6/2010 | Ghosh | G06Q 30/02 706/54 |
| 2010/0153404 A1* | 6/2010 | Ghosh | G06F 16/35 707/769 |
| 2010/0165887 A1* | 7/2010 | Ristock | H04L 65/4038 348/E7.083 |
| 2010/0169192 A1* | 7/2010 | Zoldi | G06Q 20/4016 705/30 |
| 2010/0169265 A1* | 7/2010 | Ristock | G06Q 10/0637 705/320 |
| 2010/0169430 A1* | 7/2010 | Ristock | H04L 63/105 709/224 |
| 2010/0169499 A1* | 7/2010 | Ristock | H04W 12/02 370/352 |
| 2010/0169641 A1* | 7/2010 | Ristock | H04L 63/062 713/156 |
| 2010/0228652 A1* | 9/2010 | Koraichi | H04M 15/83 455/466 |
| 2010/0274720 A1* | 10/2010 | Carlson | G06Q 20/386 705/44 |
| 2010/0303211 A1* | 12/2010 | Hartig | G06Q 20/4016 379/1.01 |
| 2011/0055100 A1* | 3/2011 | Perreault | G06Q 50/205 705/327 |
| 2011/0065490 A1* | 3/2011 | Lutnick | G07F 17/3223 463/16 |
| 2011/0091845 A1* | 4/2011 | Dorschner | G09B 19/00 434/219 |
| 2011/0111856 A1* | 5/2011 | White | G07F 17/32 463/42 |
| 2011/0131131 A1* | 6/2011 | Griffin | G06Q 40/03 705/38 |
| 2011/0238575 A1* | 9/2011 | Nightengale | H04L 61/5007 705/44 |
| 2011/0258049 A1* | 10/2011 | Ramer | G06Q 30/0273 705/14.69 |

(56) References Cited

U.S. PATENT DOCUMENTS

| | | | |
|---|---|---|---|
| 2011/0258118 A1* | 10/2011 | Ciurea | G06Q 20/40 705/44 |
| 2011/0275432 A1* | 11/2011 | Lutnick | G07F 17/3244 463/25 |
| 2011/0302011 A1* | 12/2011 | Yoder | G06Q 20/32 705/14.66 |
| 2012/0023567 A1* | 1/2012 | Hammad | G06Q 20/4018 726/9 |
| 2012/0041880 A1* | 2/2012 | Shai | G06Q 30/0601 705/26.1 |
| 2012/0077174 A1* | 3/2012 | DePaul | G09B 7/02 434/322 |
| 2012/0078699 A1* | 3/2012 | Carlson | G06Q 20/40 705/14.23 |
| 2012/0089617 A1* | 4/2012 | Frey | G06F 16/951 707/E17.084 |
| 2012/0096516 A1* | 4/2012 | Sobel | G06F 21/645 726/2 |
| 2012/0136793 A1* | 5/2012 | Valin | G06Q 30/0277 705/52 |
| 2012/0173367 A1* | 7/2012 | Soroca | G06Q 30/0267 705/26.3 |
| 2012/0173370 A1* | 7/2012 | Soroca | H04M 3/533 705/26.3 |
| 2012/0173373 A1* | 7/2012 | Soroca | H04W 4/02 705/26.3 |
| 2012/0173379 A1* | 7/2012 | Soroca | G06Q 30/08 705/26.3 |
| 2012/0179563 A1* | 7/2012 | Soroca | G06Q 30/08 705/26.3 |
| 2012/0179564 A1* | 7/2012 | Soroca | G06Q 30/08 705/26.3 |
| 2012/0179567 A1* | 7/2012 | Soroca | G06Q 30/08 705/26.3 |
| 2012/0190386 A1* | 7/2012 | Anderson | G01S 19/14 455/456.3 |
| 2012/0197711 A1* | 8/2012 | Zhou | G06Q 30/0242 705/14.41 |
| 2012/0227109 A1* | 9/2012 | Dimuro | A61Q 11/00 726/22 |
| 2012/0254092 A1* | 10/2012 | Malov | G06Q 30/0201 706/52 |
| 2012/0254243 A1* | 10/2012 | Zeppenfeld | G06Q 20/4016 707/778 |
| 2012/0264101 A1* | 10/2012 | Krohner | G06Q 10/1053 434/359 |
| 2012/0296455 A1* | 11/2012 | Ohnemus | G16H 10/60 700/91 |
| 2012/0303425 A1* | 11/2012 | Katzin | G06Q 20/4016 705/16 |
| 2012/0310831 A1* | 12/2012 | Harris | G06Q 30/02 705/44 |
| 2012/0310838 A1* | 12/2012 | Harris | G06Q 20/12 705/65 |
| 2013/0054334 A1* | 2/2013 | Ross | G06Q 20/4016 705/14.25 |
| 2013/0055097 A1* | 2/2013 | Soroca | G06Q 30/0246 715/738 |
| 2013/0102372 A1* | 4/2013 | Lutnick | G07F 17/3276 463/13 |
| 2013/0110722 A1* | 5/2013 | Boding | G06Q 20/4014 705/44 |
| 2013/0116032 A1* | 5/2013 | Lutnick | G07F 17/32 463/25 |
| 2013/0124417 A1* | 5/2013 | Spears | G06Q 20/384 709/217 |
| 2013/0144785 A1* | 6/2013 | Karpenko | G06Q 20/425 705/44 |
| 2013/0185354 A1* | 7/2013 | Seligstein | G06Q 20/20 709/204 |
| 2013/0191213 A1* | 7/2013 | Beck | G06Q 30/0207 705/14.64 |
| 2013/0197991 A1* | 8/2013 | Basu | G06Q 20/385 705/14.39 |
| 2013/0211858 A1* | 8/2013 | Ohnemus | G16H 50/30 705/3 |
| 2013/0215116 A1* | 8/2013 | Siddique | G06Q 20/40 705/26.7 |
| 2013/0218765 A1* | 8/2013 | Hammad | G06Q 20/326 705/41 |
| 2013/0246300 A1* | 9/2013 | Fischer | G06Q 50/12 705/347 |
| 2013/0268536 A1* | 10/2013 | Nachiappan | G06F 16/9535 707/741 |
| 2013/0275308 A1* | 10/2013 | Paraskeva | G06Q 20/3224 705/44 |
| 2013/0282819 A1* | 10/2013 | Mehta | G06Q 50/01 709/204 |
| 2013/0291060 A1* | 10/2013 | Moore | G06F 21/6254 726/1 |
| 2013/0332361 A1* | 12/2013 | Ciurea | G07F 9/009 705/44 |
| 2013/0332362 A1* | 12/2013 | Ciurea | G06Q 20/384 705/44 |
| 2014/0079297 A1* | 3/2014 | Tadayon | G06V 40/172 382/118 |
| 2014/0080148 A1* | 3/2014 | Spanholtz | C12N 5/0646 435/405 |
| 2014/0101146 A1* | 4/2014 | Scriffignano | G06F 16/24578 707/728 |
| 2014/0135592 A1* | 5/2014 | Ohnemus | A61B 5/4266 600/595 |
| 2014/0143133 A1* | 5/2014 | Benson | G06Q 10/10 705/38 |
| 2014/0156996 A1* | 6/2014 | Heppe | G06Q 30/00 713/168 |
| 2014/0170177 A1* | 6/2014 | Zuniga | A61K 35/57 424/184.1 |
| 2014/0172706 A1* | 6/2014 | Condry | G06Q 20/4016 705/44 |
| 2014/0180826 A1* | 6/2014 | Boal | G06Q 30/0269 705/14.66 |
| 2014/0188752 A1* | 7/2014 | White | G06Q 10/083 705/337 |
| 2014/0201126 A1* | 7/2014 | Zadeh | A61B 5/165 706/52 |
| 2014/0236713 A1* | 8/2014 | Gotanda | G06Q 20/209 705/14.51 |
| 2014/0237582 A1* | 8/2014 | Niemela | H04L 9/3268 726/10 |
| 2014/0279513 A1* | 9/2014 | Dodds-Brown | G06Q 20/4016 705/44 |
| 2014/0282977 A1* | 9/2014 | Madhu | H04L 63/1433 726/7 |
| 2014/0283054 A1* | 9/2014 | Janjua | H04L 63/1408 726/23 |
| 2014/0283065 A1* | 9/2014 | Teddy | H04L 63/145 726/23 |
| 2014/0283066 A1* | 9/2014 | Teddy | G06F 21/51 726/23 |
| 2014/0289853 A1* | 9/2014 | Teddy | G06F 21/566 726/23 |
| 2014/0304059 A1* | 10/2014 | Wang | G06Q 30/0234 705/14.34 |
| 2014/0304148 A1* | 10/2014 | Flanagan | G06Q 20/4016 705/39 |
| 2014/0304505 A1* | 10/2014 | Dawson | G06F 21/6227 713/165 |
| 2014/0337089 A1* | 11/2014 | Tavares | G06Q 30/0201 705/7.29 |
| 2014/0337171 A1* | 11/2014 | Sivashanmugam | G06Q 20/4016 705/26.35 |
| 2014/0351137 A1* | 11/2014 | Chisholm | G06Q 40/02 705/44 |
| 2014/0373093 A1* | 12/2014 | Wood | G06Q 20/4016 726/3 |

(56) References Cited

U.S. PATENT DOCUMENTS

| | | | |
|---|---|---|---|
| 2015/0046216 A1* | 2/2015 | Adjaoute | G06Q 20/384 705/7.29 |
| 2015/0046224 A1* | 2/2015 | Adjaoute | G06Q 30/0202 705/7.31 |
| 2015/0066771 A1* | 3/2015 | Adjaoute | G06Q 20/4016 705/44 |
| 2015/0073907 A1* | 3/2015 | Purves | G06Q 20/384 705/14.58 |
| 2015/0073989 A1* | 3/2015 | Green | G06Q 20/405 705/44 |
| 2015/0074390 A1* | 3/2015 | Stoback | H04L 63/1483 713/156 |
| 2015/0074407 A1* | 3/2015 | Palmeri | H04L 67/1095 713/171 |
| 2015/0086946 A1* | 3/2015 | Mandina | G06Q 50/04 434/218 |
| 2015/0095990 A1* | 4/2015 | Ranganathan | G06F 21/33 726/4 |
| 2015/0106265 A1* | 4/2015 | Stubblefield | G06Q 20/4016 705/325 |
| 2015/0134528 A1* | 5/2015 | Fineman | G06Q 20/24 705/44 |
| 2015/0150107 A1* | 5/2015 | Piliouras | H04L 63/102 726/7 |
| 2015/0213449 A1* | 7/2015 | Morrison | G06Q 20/4016 705/44 |
| 2015/0213460 A1* | 7/2015 | Anderson | G06Q 50/20 705/318 |
| 2015/0220835 A1* | 8/2015 | Wilson | G06Q 30/0269 706/46 |
| 2015/0220836 A1* | 8/2015 | Wilson | G06Q 30/0631 706/46 |
| 2015/0220929 A1* | 8/2015 | Monk | G07C 9/00 705/13 |
| 2015/0221055 A1* | 8/2015 | Comanescu | G06Q 50/184 705/310 |
| 2015/0229666 A1* | 8/2015 | Foster | H04L 65/403 726/22 |
| 2015/0242601 A1* | 8/2015 | Griffiths | H04L 63/105 726/5 |
| 2015/0242605 A1* | 8/2015 | Du | G06F 21/32 726/7 |
| 2015/0249677 A1* | 9/2015 | Tucker | H04L 63/1433 726/25 |
| 2015/0254672 A1* | 9/2015 | Huesch | G06Q 20/306 705/44 |
| 2015/0262189 A1* | 9/2015 | Vergeer | G06Q 30/018 705/317 |
| 2015/0269433 A1* | 9/2015 | Amtrup | H04N 1/00106 382/115 |
| 2015/0310510 A1* | 10/2015 | Kelly | H04W 4/02 705/13 |
| 2015/0332304 A1* | 11/2015 | Wright | G06Q 30/0209 705/14.27 |
| 2015/0347734 A1* | 12/2015 | Beigi | H04L 9/3268 726/28 |
| 2015/0365436 A1* | 12/2015 | Shenefiel | H04L 63/123 726/1 |
| 2016/0004820 A1* | 1/2016 | Moore | G16H 15/00 705/3 |
| 2016/0036593 A1* | 2/2016 | Saboori | H04L 63/0823 713/156 |
| 2016/0048937 A1* | 2/2016 | Mathura | G06Q 40/12 705/30 |
| 2016/0050203 A1* | 2/2016 | Hefetz | H04L 51/18 726/7 |
| 2016/0070704 A1* | 3/2016 | Yu | G06F 16/9538 707/723 |
| 2016/0078247 A1* | 3/2016 | Tucker | G06F 21/602 726/1 |
| 2016/0078444 A1* | 3/2016 | Tomasofsky | G06F 21/34 705/44 |
| 2016/0086184 A1* | 3/2016 | Carpenter | G06Q 20/4016 705/44 |
| 2016/0092879 A1* | 3/2016 | Lasersohn | G06Q 20/382 705/75 |
| 2016/0104132 A1* | 4/2016 | Abbatiello | G06Q 20/386 705/39 |
| 2016/0104133 A1* | 4/2016 | Davis | G06Q 20/10 705/39 |
| 2016/0104159 A1* | 4/2016 | Butterfield | G06Q 20/223 705/44 |
| 2016/0104387 A1* | 4/2016 | Bakker | G09B 5/02 434/365 |
| 2016/0117670 A1* | 4/2016 | Davis | G06Q 20/3255 705/39 |
| 2016/0125306 A1* | 5/2016 | Jihn | G06N 7/01 706/52 |
| 2016/0140439 A1* | 5/2016 | Adderly | G06F 16/367 706/46 |
| 2016/0140445 A1* | 5/2016 | Adderly | G06F 40/30 706/52 |
| 2016/0140446 A1* | 5/2016 | Adderly | G06N 5/022 706/51 |
| 2016/0140453 A1* | 5/2016 | Adderly | G06N 5/022 706/11 |
| 2016/0140561 A1* | 5/2016 | Cowan | G06Q 20/4016 705/26.35 |
| 2016/0140858 A1* | 5/2016 | Adderly | G06F 40/30 704/9 |
| 2016/0147875 A1* | 5/2016 | Adderly | G06F 40/30 707/726 |
| 2016/0148093 A1* | 5/2016 | Adderly | G06F 16/958 706/46 |
| 2016/0149900 A1* | 5/2016 | Justin | H04L 9/3263 713/156 |
| 2016/0180084 A1* | 6/2016 | Spurlock | H04L 63/1441 726/22 |
| 2016/0180325 A1* | 6/2016 | Davis | G06Q 20/40 705/44 |
| 2016/0196558 A1* | 7/2016 | Mercille | G06Q 20/3278 705/44 |
| 2016/0203490 A1* | 7/2016 | Gupta | G06Q 20/4016 705/44 |
| 2016/0203491 A1* | 7/2016 | Ranganathan | G06F 21/33 705/44 |
| 2016/0210602 A1* | 7/2016 | Siddique | G06Q 20/047 |
| 2016/0217486 A1* | 7/2016 | Waters | G06Q 30/0226 |
| 2016/0219079 A1* | 7/2016 | Justin | H04L 63/123 |
| 2016/0225278 A1* | 8/2016 | Leddy | G09B 7/06 |
| 2016/0267447 A1* | 9/2016 | Davis | G06Q 20/10 |
| 2016/0271501 A1* | 9/2016 | Balsbaugh | A63F 13/65 |
| 2016/0275503 A1* | 9/2016 | George | G06Q 30/0222 |
| 2016/0275518 A1* | 9/2016 | Bowles | G06V 40/166 |
| 2016/0277192 A1* | 9/2016 | Kaliski, Jr. | H04L 63/0815 |
| 2016/0277193 A1* | 9/2016 | Sabin | H04L 9/321 |
| 2016/0292745 A1* | 10/2016 | Jayanthi | G06F 16/9577 |
| 2016/0294846 A1* | 10/2016 | Sharov | G06F 16/24578 |
| 2016/0330236 A1* | 11/2016 | Reddy | H04L 63/1416 |
| 2016/0335551 A1* | 11/2016 | Droll | G06Q 20/4016 |
| 2016/0344544 A1* | 11/2016 | Biesinger | H04L 63/20 |
| 2016/0364678 A1* | 12/2016 | Cao | G06Q 10/083 |
| 2016/0364679 A1* | 12/2016 | Cao | G06Q 50/30 |
| 2016/0364812 A1* | 12/2016 | Cao | G06Q 50/30 |
| 2016/0364823 A1* | 12/2016 | Cao | G01C 21/3438 |
| 2016/0371685 A1* | 12/2016 | Smith | G06Q 20/4016 |
| 2016/0373433 A1* | 12/2016 | Rivers | H04L 9/3265 |
| 2017/0005805 A1* | 1/2017 | Wang | G06F 21/00 |
| 2017/0012967 A1* | 1/2017 | Holloway | H04L 63/0823 |
| 2017/0017800 A1* | 1/2017 | Comanescu | G06Q 10/10 |
| 2017/0032374 A1* | 2/2017 | Doddamani | G06Q 20/4016 |
| 2017/0061129 A1* | 3/2017 | Bektchiev | G06F 11/3452 |
| 2017/0069215 A1* | 3/2017 | Borofsky | G09B 7/04 |
| 2017/0083881 A1* | 3/2017 | Sardela Bianchi | G06Q 50/01 |
| 2017/0083953 A1* | 3/2017 | Arora | G06Q 20/325 |
| 2017/0083985 A1* | 3/2017 | Lacoss-Arnold | G06Q 20/20 |
| 2017/0098219 A1* | 4/2017 | Peram | G06Q 20/3224 |
| 2017/0109818 A1* | 4/2017 | Amtrup | G06V 30/412 |
| 2017/0116611 A1* | 4/2017 | Dhar | G06Q 20/405 |

(56) References Cited

U.S. PATENT DOCUMENTS

| | | | |
|---|---|---|---|
| 2017/0124570 A1* | 5/2017 | Nidamanuri | G06Q 20/4016 |
| 2017/0134173 A1* | 5/2017 | Kern | H04L 9/3268 |
| 2017/0154336 A1* | 6/2017 | Marshall | G06Q 30/0201 |
| 2017/0171230 A1* | 6/2017 | Leiderfarb | H04L 63/145 |
| 2017/0178093 A1* | 6/2017 | Bull | G06Q 20/10 |
| 2017/0178124 A1* | 6/2017 | Havilio | G06Q 20/382 |
| 2017/0178135 A1* | 6/2017 | Bull | G06Q 20/40 |
| 2017/0193506 A1* | 7/2017 | Karnati | G06Q 30/0251 |
| 2017/0195125 A1* | 7/2017 | Heppe | H04L 63/0823 |
| 2017/0200015 A1* | 7/2017 | Gonzalez | H04L 63/1408 |
| 2017/0206557 A1* | 7/2017 | Abrol | G06Q 50/01 |
| 2017/0232300 A1* | 8/2017 | Tran | G06F 1/163 |
| | | | 434/247 |
| 2017/0253067 A1* | 9/2017 | Nelson | B65D 25/10 |
| 2017/0262842 A1* | 9/2017 | Subbarayan | G06Q 20/38215 |
| 2017/0308702 A1* | 10/2017 | Liu | G06F 21/561 |
| 2017/0353482 A1* | 12/2017 | Sommer | H04L 63/1433 |
| 2018/0032997 A1* | 2/2018 | Gordon | G06Q 30/0269 |
| 2018/0039990 A1* | 2/2018 | Lindemann | G06V 40/19 |
| 2018/0040064 A1* | 2/2018 | Grigg | H04L 41/145 |
| 2018/0053114 A1* | 2/2018 | Adjaoute | G06N 20/00 |
| 2018/0060981 A1* | 3/2018 | Sher | G06Q 50/163 |
| 2018/0078843 A1* | 3/2018 | Tran | G09B 19/0038 |
| 2018/0096329 A1* | 4/2018 | Hamilton | G06Q 20/322 |
| 2018/0096330 A1* | 4/2018 | Hamilton | G06Q 20/20 |
| 2018/0117446 A1* | 5/2018 | Tran | G06F 1/163 |
| 2018/0117447 A1* | 5/2018 | Tran | G09B 19/0038 |
| 2018/0158062 A1* | 6/2018 | Kohli | G06Q 20/4016 |
| 2018/0174137 A1* | 6/2018 | Subbarayan | G06Q 50/01 |
| 2018/0174138 A1* | 6/2018 | Subbarayan | G06Q 20/385 |
| 2018/0191750 A1* | 7/2018 | Moradi | G06N 7/01 |
| 2018/0204111 A1* | 7/2018 | Zadeh | G06V 10/764 |
| 2018/0232820 A1* | 8/2018 | Kohli | G06Q 20/4014 |
| 2018/0247312 A1* | 8/2018 | Loganathan | G06Q 20/4014 |
| 2018/0253730 A1* | 9/2018 | Vohra | G06Q 20/401 |
| 2018/0264347 A1* | 9/2018 | Tran | G06V 40/28 |
| 2018/0268387 A1* | 9/2018 | Bradley | G06Q 20/322 |
| 2018/0295518 A1* | 10/2018 | Alloche | H04L 9/3268 |
| 2018/0315051 A1* | 11/2018 | Hurley | G06Q 20/326 |
| 2018/0322597 A1* | 11/2018 | Sher | G06Q 50/163 |
| 2018/0330814 A1* | 11/2018 | Auer | G16H 40/20 |
| 2018/0365666 A1* | 12/2018 | Kakino | G06K 7/1413 |
| 2019/0007381 A1* | 1/2019 | Isaacson | G06Q 20/12 |
| 2019/0018968 A1* | 1/2019 | Ronca | G06F 21/577 |
| 2019/0020635 A1* | 1/2019 | Selway | G06F 21/602 |
| 2019/0074081 A1* | 3/2019 | Easton | G06Q 10/10 |
| 2019/0095924 A1* | 3/2019 | Adjaoute | G06Q 20/4016 |
| 2019/0130407 A1* | 5/2019 | Adjaoute | G06Q 20/384 |
| 2019/0132308 A1* | 5/2019 | Graham | H04L 63/0876 |
| 2019/0140847 A1* | 5/2019 | Piel | H04L 9/3268 |
| 2019/0143527 A1* | 5/2019 | Favis | B25J 11/0015 |
| | | | 700/264 |
| 2019/0147431 A1* | 5/2019 | Galebach | H04L 9/3247 |
| | | | 705/44 |
| 2019/0164156 A1* | 5/2019 | Lindemann | H04L 9/3247 |
| 2019/0197616 A1* | 6/2019 | Dogin | G06Q 20/4016 |
| 2019/0205887 A1* | 7/2019 | Kimmel | G06F 21/6245 |
| 2019/0213585 A1* | 7/2019 | Patni | H04L 63/0838 |
| 2019/0213658 A1* | 7/2019 | Bhattacherjee | G06Q 20/12 |
| 2019/0220863 A1* | 7/2019 | Novick | G06Q 20/10 |
| 2019/0230070 A1* | 7/2019 | Isaacson | H04W 12/084 |
| 2019/0236594 A1* | 8/2019 | Ehrlich-Quinn | G06Q 20/401 |
| 2019/0251589 A1* | 8/2019 | VanFleet | G06Q 20/40 |
| 2019/0259108 A1* | 8/2019 | Bongartz | G06Q 10/0639 |
| 2019/0279218 A1* | 9/2019 | Adjaoute | G06N 5/043 |
| 2019/0281036 A1* | 9/2019 | Eisen | G06F 21/31 |
| 2019/0287116 A1* | 9/2019 | Karantzis | G06Q 20/4014 |
| 2019/0306082 A1* | 10/2019 | Horvath | G06Q 40/12 |
| 2019/0306137 A1* | 10/2019 | Isaacson | G06Q 20/12 |
| 2019/0318358 A1* | 10/2019 | Chamberlain | G06Q 20/3223 |
| 2019/0331655 A1* | 10/2019 | Jahns | C11B 9/00 |
| 2019/0332637 A1* | 10/2019 | Yoo | G06F 16/906 |
| 2019/0361917 A1* | 11/2019 | Tran | H04W 12/108 |
| 2019/0370813 A1* | 12/2019 | Bravick | G06Q 20/02 |
| 2019/0379642 A1* | 12/2019 | Simons | H04L 63/0281 |
| 2019/0384932 A1* | 12/2019 | Pratt | H04W 12/61 |
| 2019/0385170 A1* | 12/2019 | Arrabothu | G06N 3/08 |
| 2019/0386986 A1* | 12/2019 | O'Brien | G07C 5/008 |
| 2019/0392457 A1* | 12/2019 | Kuntagod | H04L 67/12 |
| 2019/0392489 A1* | 12/2019 | Tietzen | G06Q 20/102 |
| 2020/0027089 A1* | 1/2020 | Kuchar | G06Q 20/3821 |
| 2020/0044851 A1* | 2/2020 | Everson | G06Q 20/3821 |
| 2020/0052908 A1* | 2/2020 | Thitron | H04L 63/20 |
| 2020/0067944 A1* | 2/2020 | Dave | H04W 12/66 |
| 2020/0082484 A1* | 3/2020 | Cho | G06Q 50/20 |
| 2020/0097817 A1* | 3/2020 | Harris | G06N 3/04 |
| 2020/0104852 A1* | 4/2020 | Douglas, Jr. | G06Q 20/24 |
| 2020/0118131 A1* | 4/2020 | Diriye | H04L 9/3239 |
| 2020/0120107 A1* | 4/2020 | McGrew | G06N 20/00 |
| 2020/0134143 A1* | 4/2020 | Deole | G06F 21/64 |
| 2020/0137221 A1* | 4/2020 | DelloStritto | H04M 3/42068 |
| 2020/0151707 A1* | 5/2020 | Mohamed | G06Q 20/409 |
| 2020/0153821 A1* | 5/2020 | Cao | H04L 63/0861 |
| 2020/0162491 A1* | 5/2020 | Correa Bahnsen | G06N 3/044 |
| 2020/0175516 A1* | 6/2020 | Trim | G06Q 20/4014 |
| 2020/0184153 A1* | 6/2020 | Bongartz | A01G 9/24 |
| 2020/0184278 A1* | 6/2020 | Zadeh | G06N 3/044 |
| 2020/0184480 A1* | 6/2020 | Wang | G06Q 20/3224 |
| 2020/0184556 A1* | 6/2020 | Cella | G06Q 10/0639 |
| 2020/0193168 A1* | 6/2020 | Zhao | G06F 18/22 |
| 2020/0211075 A1* | 7/2020 | Kumar | G06Q 20/4016 |
| 2020/0225655 A1* | 7/2020 | Cella | G05B 19/41875 |
| 2020/0226285 A1* | 7/2020 | Bulleit | G06F 21/33 |
| 2020/0244716 A1* | 7/2020 | Mehta | G06Q 20/405 |
| 2020/0258181 A1* | 8/2020 | Song | G06Q 40/02 |
| 2020/0265416 A1* | 8/2020 | Tomasofsky | G06Q 20/405 |
| 2020/0265514 A1* | 8/2020 | Suzuki | G06Q 50/18 |
| 2020/0273040 A1* | 8/2020 | Novick | G06Q 20/4016 |
| 2020/0285768 A1* | 9/2020 | Hodges, Sr. | G06Q 50/265 |
| 2020/0287888 A1* | 9/2020 | Moore | H04L 63/0892 |
| 2020/0288315 A1* | 9/2020 | Hanley | G06Q 20/4016 |
| 2020/0294128 A1* | 9/2020 | Cella | H04L 9/3239 |
| 2020/0302496 A1* | 9/2020 | Todd | G06Q 30/0282 |
| 2020/0311736 A1* | 10/2020 | Song | G06Q 20/383 |
| 2020/0327546 A1* | 10/2020 | Pennington | G06Q 20/065 |
| 2020/0334685 A1* | 10/2020 | Yan | G06Q 20/4016 |
| 2020/0342411 A1* | 10/2020 | Yakubenkov | G06Q 10/1053 |
| 2020/0342461 A1* | 10/2020 | Quentin | G06Q 20/4016 |
| 2020/0348662 A1* | 11/2020 | Cella | G05B 19/41865 |
| 2020/0357080 A1* | 11/2020 | Bogaard | G06Q 20/40145 |
| 2020/0358619 A1* | 11/2020 | Ding | H04L 9/3242 |
| 2020/0364322 A1* | 11/2020 | Guo | G06N 5/04 |
| 2020/0372507 A1* | 11/2020 | Liu | G06Q 20/3274 |
| 2020/0380538 A1* | 12/2020 | Chau | G06Q 20/384 |
| 2020/0382480 A1* | 12/2020 | Isaacson | G06Q 20/384 |
| 2020/0402058 A1* | 12/2020 | Zhou | G06Q 20/385 |
| 2020/0402195 A1* | 12/2020 | Rossides | G07F 17/3244 |
| 2020/0410820 A1* | 12/2020 | Ellis | G06Q 20/108 |
| 2021/0011741 A1* | 1/2021 | Bartfai-Walcott | H04L 9/3247 |
| 2021/0012254 A1* | 1/2021 | Campbell | G06Q 30/0185 |
| 2021/0019727 A1* | 1/2021 | Edwards | G06Q 20/4015 |
| 2021/0020168 A1* | 1/2021 | Dame | G10L 25/84 |
| 2021/0027404 A1* | 1/2021 | de Bold | G06Q 50/18 |
| 2021/0042741 A1* | 2/2021 | Lu | G06F 21/602 |
| 2021/0056562 A1* | 2/2021 | Hart | G06F 16/27 |
| 2021/0056581 A1* | 2/2021 | Kumar | G06Q 40/02 |
| 2021/0058377 A1* | 2/2021 | Khan | G06F 16/22 |
| 2021/0058392 A1* | 2/2021 | Leddy, III | G06Q 20/388 |
| 2021/0065174 A1* | 3/2021 | Singh | G06Q 20/3676 |
| 2021/0089761 A1* | 3/2021 | Tyomkin | A63B 69/3605 |
| 2021/0103932 A1* | 4/2021 | Turgeon | G06Q 20/4015 |
| 2021/0110369 A1* | 4/2021 | Hamasako | G06Q 20/40155 |
| 2021/0117515 A1* | 4/2021 | Bartfai-Walcott | G06F 21/105 |
| 2021/0133722 A1* | 5/2021 | Hoffman | G06Q 20/227 |
| 2021/0142591 A1* | 5/2021 | Liu | G07C 5/008 |
| 2021/0157312 A1* | 5/2021 | Cella | G01M 13/045 |
| 2021/0158360 A1* | 5/2021 | Somani | H04L 63/0838 |
| 2021/0173674 A1* | 6/2021 | Rose | G06Q 20/4016 |
| 2021/0174321 A1* | 6/2021 | Rose | H04L 41/22 |
| 2021/0174347 A1* | 6/2021 | Rose | H04L 63/0428 |
| 2021/0176274 A1* | 6/2021 | Ben David | H04L 63/1433 |
| 2021/0176340 A1* | 6/2021 | Rose | G06Q 20/405 |
| 2021/0194883 A1* | 6/2021 | Badhwar | H04L 63/107 |
| 2021/0201291 A1* | 7/2021 | Brody | G06Q 20/12 |

(56) References Cited

U.S. PATENT DOCUMENTS

| | | | |
|---|---|---|---|
| 2021/0201328 A1* | 7/2021 | Gunther | H04L 9/3073 |
| 2021/0203690 A1* | 7/2021 | Nunes | G06N 3/088 |
| 2021/0203691 A1* | 7/2021 | Pratt | H04L 63/1416 |
| 2021/0203692 A1* | 7/2021 | Nunes | H04L 63/1483 |
| 2021/0203693 A1* | 7/2021 | Clausen | H04L 63/1425 |
| 2021/0209600 A1* | 7/2021 | Fontana | G06Q 40/02 |
| 2021/0216991 A1* | 7/2021 | Grassadonia | G06Q 20/385 |
| 2021/0226921 A1* | 7/2021 | Rose | H04L 63/0272 |
| 2021/0241256 A1* | 8/2021 | Caldwell | G06Q 20/322 |
| 2021/0248594 A1* | 8/2021 | Yantis | G06F 21/602 |
| 2021/0256355 A1* | 8/2021 | Chen | G06N 3/08 |
| 2021/0256489 A1* | 8/2021 | Jivan | G06Q 20/405 |
| 2021/0256509 A1* | 8/2021 | Gulati | G06Q 20/204 |
| 2021/0264455 A1* | 8/2021 | Way | G06Q 20/204 |
| 2021/0279762 A1* | 9/2021 | Eklund | G06Q 30/0226 |
| 2021/0281569 A1* | 9/2021 | Soon-Shiong | H04L 63/20 |
| 2021/0287264 A1* | 9/2021 | Sherif | G06Q 20/4016 |
| 2021/0288951 A1* | 9/2021 | Rose | H04L 63/0861 |
| 2021/0294287 A1* | 9/2021 | Valin | H02K 9/19 |
| 2021/0297448 A1* | 9/2021 | Keith, Jr. | G06F 21/32 |
| 2021/0304206 A1* | 9/2021 | Juneja | G06Q 20/206 |
| 2021/0304226 A1* | 9/2021 | Johnson | G06Q 10/06393 |
| 2021/0312026 A1* | 10/2021 | Rose | G06Q 20/065 |
| 2021/0312379 A1* | 10/2021 | Mimassi | G06Q 10/087 |
| 2021/0312440 A1* | 10/2021 | Badal-Badalian | G06Q 20/3278 |
| 2021/0312441 A1* | 10/2021 | Dawson, V | H04L 63/20 |
| 2021/0312466 A1* | 10/2021 | Thomason | G06Q 30/04 |
| 2021/0319385 A1* | 10/2021 | Chau | G06Q 40/03 |
| 2021/0319424 A1* | 10/2021 | Shah | G06F 40/30 |
| 2021/0320917 A1* | 10/2021 | Rose | H04L 63/0428 |
| 2021/0326476 A1* | 10/2021 | Su | H04L 9/3239 |
| 2021/0334814 A1* | 10/2021 | Sawant | G06Q 30/0603 |
| 2021/0342836 A1* | 11/2021 | Cella | H04L 9/3239 |
| 2021/0342841 A1* | 11/2021 | Pham | G06Q 20/327 |
| 2021/0345001 A1* | 11/2021 | Rustamov | H04N 21/251 |
| 2021/0350011 A1* | 11/2021 | Ashlock | G06N 20/00 |
| 2021/0350262 A1* | 11/2021 | Song | G06Q 20/4016 |
| 2021/0350357 A1* | 11/2021 | Lafontaine | G06Q 20/401 |
| 2021/0352478 A1* | 11/2021 | Hauser | H04W 12/068 |
| 2021/0357892 A1* | 11/2021 | Srivastava | G06Q 20/1235 |
| 2021/0358032 A1* | 11/2021 | Cella | G06F 16/2379 |
| 2021/0365897 A1* | 11/2021 | Bansal | G07G 1/0009 |
| 2021/0365916 A1* | 11/2021 | Benkreira | G06Q 20/405 |
| 2021/0365968 A1* | 11/2021 | Narula | G06Q 30/0201 |
| 2021/0368316 A1* | 11/2021 | Tiwari | G06Q 20/20 |
| 2021/0374749 A1* | 12/2021 | Vukich | G06Q 20/389 |
| 2021/0377303 A1* | 12/2021 | Bui | G06F 40/14 |
| 2021/0377304 A1* | 12/2021 | Ma | G06F 40/284 |
| 2021/0386987 A1* | 12/2021 | Azdoud | B25J 9/1679 |
| 2021/0389854 A1* | 12/2021 | Rose | G06F 3/0482 |
| 2021/0390200 A1* | 12/2021 | Goodsitt | G06F 21/6227 |
| 2021/0390549 A1* | 12/2021 | Rule | H04L 9/0637 |
| 2021/0390550 A1* | 12/2021 | Liao | G06N 20/00 |
| 2021/0390556 A1* | 12/2021 | Bermudez | G06Q 20/4016 |
| 2021/0390649 A1* | 12/2021 | Cho | G06Q 50/2053 |
| 2021/0398090 A1* | 12/2021 | Yan | G06Q 20/065 |
| 2021/0398099 A1* | 12/2021 | Adato | G06T 7/0006 |
| 2021/0398100 A1* | 12/2021 | Gabriele | G06Q 20/227 |
| 2021/0398133 A1* | 12/2021 | Zhu | G06F 16/9535 |
| 2021/0398136 A1* | 12/2021 | Cebertowicz | G06Q 30/0185 |
| 2021/0398188 A1* | 12/2021 | Jafa | G06Q 30/0627 |
| 2021/0406003 A1* | 12/2021 | Crabtree | G06F 21/64 |
| 2021/0406613 A1* | 12/2021 | More | G06F 21/564 |
| 2021/0406942 A1* | 12/2021 | Lilley | G06Q 30/0214 |
| 2021/0409374 A1* | 12/2021 | Boding | H04L 63/20 |
| 2022/0005092 A1* | 1/2022 | Agrawal | G06Q 20/207 |
| 2022/0012672 A1* | 1/2022 | Inman | G06F 21/32 |
| 2022/0012682 A1* | 1/2022 | Koritala | G06Q 20/425 |
| 2022/0012743 A1* | 1/2022 | Snell | G06Q 20/322 |
| 2022/0012803 A1* | 1/2022 | Walters | G06Q 20/3221 |
| 2022/0012817 A1* | 1/2022 | Singh | G06N 3/08 |
| 2022/0020087 A1* | 1/2022 | Sundarajan | G06N 20/00 |
| 2022/0027915 A1* | 1/2022 | Cameron | G06Q 20/12 |
| 2022/0027935 A1* | 1/2022 | Lee | G06Q 30/0238 |
| 2022/0028513 A1* | 1/2022 | Gangaikondan-Iyer | G06Q 40/08 |
| 2022/0036324 A1* | 2/2022 | Renke | G06Q 20/102 |
| 2022/0036326 A1* | 2/2022 | Varma | G06Q 20/387 |
| 2022/0036450 A1* | 2/2022 | Sanghvi | G06Q 20/22 |
| 2022/0044180 A1* | 2/2022 | Murao | G06Q 20/045 |
| 2022/0044269 A1* | 2/2022 | Silberman-Sais | G06F 16/24575 |
| 2022/0050751 A1* | 2/2022 | Hazra | G06F 11/3006 |
| 2022/0051214 A1* | 2/2022 | Edwards | G06V 40/161 |
| 2022/0057918 A1* | 2/2022 | Rose | G06Q 20/4016 |
| 2022/0058633 A1* | 2/2022 | Yantis | G06Q 20/3676 |
| 2022/0058638 A1* | 2/2022 | Edwards | G06Q 20/405 |
| 2022/0058723 A1* | 2/2022 | Swett | G06Q 20/3276 |
| 2022/0067687 A1* | 3/2022 | Hay | G06N 20/00 |
| 2022/0075825 A1* | 3/2022 | Helms | H04L 9/3234 |
| 2022/0084111 A1* | 3/2022 | Ladzik | G06Q 20/389 |
| 2022/0092627 A1* | 3/2022 | Woodrick | G06Q 30/0208 |
| 2022/0101321 A1* | 3/2022 | Jones | G06Q 20/401 |
| 2022/0101326 A1* | 3/2022 | Kim | G06Q 20/4016 |
| 2022/0108262 A1* | 4/2022 | Cella | G06Q 10/063118 |
| 2022/0108291 A1* | 4/2022 | Cain, Jr. | G06F 16/2379 |
| 2022/0108301 A1* | 4/2022 | Gupta | G06Q 20/3415 |
| 2022/0114593 A1* | 4/2022 | Johnson | G06F 18/24133 |
| 2022/0114594 A1* | 4/2022 | Nunes | G06Q 20/4016 |
| 2022/0114664 A1* | 4/2022 | Curtis | G06Q 20/065 |
| 2022/0116398 A1* | 4/2022 | Rose | H04L 9/0891 |
| 2022/0116415 A1* | 4/2022 | Burgis | H04L 67/51 |
| 2022/0116736 A1* | 4/2022 | Williams | A61B 5/4833 |
| 2022/0121884 A1* | 4/2022 | Zadeh | G06N 3/043 |
| 2022/0122076 A1* | 4/2022 | Braun | G06Q 40/02 |
| 2022/0122087 A1* | 4/2022 | Gosset | G06Q 20/027 |
| 2022/0122090 A1* | 4/2022 | Patne | G07C 5/008 |
| 2022/0138753 A1* | 5/2022 | Wright | G06Q 20/4016 705/44 |
| 2022/0147815 A1* | 5/2022 | Conwell | H04L 63/1416 |
| 2022/0148107 A1* | 5/2022 | Chaudhary | G06N 3/045 |
| 2022/0150275 A1* | 5/2022 | McNee | H04L 63/1441 |
| 2022/0159056 A1* | 5/2022 | Rose | G06F 21/32 |
| 2022/0164740 A1* | 5/2022 | Winborne | G06Q 20/389 |
| 2022/0164796 A1* | 5/2022 | Kollamparambil | G06F 16/9024 |
| 2022/0174066 A1* | 6/2022 | Rose | H04L 63/08 |
| 2022/0180333 A1* | 6/2022 | Kim | G06Q 20/0655 |
| 2022/0188391 A1* | 6/2022 | Pai | G06Q 20/40145 |
| 2022/0188833 A1* | 6/2022 | May | G06Q 20/40145 |
| 2022/0198562 A1* | 6/2022 | Cella | G06Q 40/04 |
| 2022/0207575 A1* | 6/2022 | Wilson | G06Q 20/203 |
| 2022/0222662 A1* | 7/2022 | Ketharaju | G06Q 20/401 |
| 2022/0222750 A1* | 7/2022 | Lebow | G06Q 20/02 |
| 2022/0245546 A1* | 8/2022 | Castinado | G06F 8/60 |
| 2022/0245574 A1* | 8/2022 | Cella | G06Q 10/087 |
| 2022/0245641 A1* | 8/2022 | Wintle | G06Q 20/102 |
| 2022/0261818 A1* | 8/2022 | Litvak-Hinenzon | G06Q 30/0282 |
| 2022/0270168 A1* | 8/2022 | Daya | G06Q 40/03 |
| 2022/0277252 A1* | 9/2022 | Serafina | G06Q 10/06398 |
| 2022/0277295 A1* | 9/2022 | Robinson-Morgan | G06Q 20/40145 |
| 2022/0292513 A1* | 9/2022 | Bungert | G06Q 20/405 |
| 2022/0309507 A1* | 9/2022 | Ross | G06Q 20/02 |
| 2022/0351192 A1* | 11/2022 | McGregor | G06Q 20/3827 |
| 2022/0353275 A1* | 11/2022 | Syngal | H04L 63/104 |
| 2022/0358193 A1* | 11/2022 | Chaudhary | G06F 16/24564 |
| 2022/0360663 A1* | 11/2022 | Kempson | H04M 3/42306 |
| 2022/0366358 A1* | 11/2022 | Perez | G06Q 30/0631 |
| 2022/0366430 A1* | 11/2022 | Steckel | G06Q 30/0185 |
| 2022/0366494 A1* | 11/2022 | Cella | H04L 9/50 |
| 2022/0374855 A1* | 11/2022 | Balaoro | G06Q 20/401 |
| 2022/0383325 A1* | 12/2022 | Hoffman | G06Q 20/4018 |
| 2022/0383385 A1* | 12/2022 | Costello | G06Q 20/20 |
| 2022/0391720 A1* | 12/2022 | Dande | G06Q 50/60 |
| 2022/0391910 A1* | 12/2022 | Thams | G06N 5/04 |
| 2022/0391987 A1* | 12/2022 | Allogia | G06Q 20/401 |
| 2022/0414664 A1* | 12/2022 | Liu | H04L 9/3247 |
| 2023/0010257 A1* | 1/2023 | Chauhan | G06Q 20/1085 |
| 2023/0011209 A1* | 1/2023 | Fenichel | G06Q 20/4016 |
| 2023/0032497 A1* | 2/2023 | Zevetchin | G06Q 20/4016 |
| 2023/0033490 A1* | 2/2023 | Yeh | G06Q 20/12 |

(56) References Cited

U.S. PATENT DOCUMENTS

| | | | |
|---|---|---|---|
| 2023/0049335 A1* | 2/2023 | Lowe | G06Q 20/401 |
| 2023/0051225 A1* | 2/2023 | Nair | G06F 18/232 |
| 2023/0057996 A1* | 2/2023 | Pawelkiewicz | G06Q 40/03 |
| 2023/0058572 A1* | 2/2023 | Moritz | G06Q 20/4015 |
| 2023/0065289 A1* | 3/2023 | Kapur | G06F 21/45 |
| 2023/0066272 A1* | 3/2023 | Patel | G06Q 20/326 |
| 2023/0069223 A1* | 3/2023 | Patel | G06Q 20/065 |
| 2023/0075741 A1* | 3/2023 | Medvinsky | G06Q 20/4016 |
| 2023/0078448 A1* | 3/2023 | Cella | G06Q 10/06311 705/7.13 |
| 2023/0083724 A1* | 3/2023 | Cella | G06Q 20/389 705/28 |
| 2023/0084684 A1* | 3/2023 | Kartik | G06Q 30/018 705/7.18 |
| 2023/0092596 A1* | 3/2023 | Kartoun | H04L 63/10 726/3 |
| 2023/0098602 A1* | 3/2023 | Cella | B29C 64/386 700/248 |
| 2023/0099266 A1* | 3/2023 | Horan | G06Q 10/1057 705/2 |
| 2023/0100394 A1* | 3/2023 | Atkin | G06F 21/604 726/21 |
| 2023/0102048 A1* | 3/2023 | Cella | B25J 9/1661 700/248 |
| 2023/0106368 A1* | 4/2023 | Tanaka | G06Q 30/0236 382/118 |
| 2023/0106639 A1* | 4/2023 | Wagener | G06N 3/04 726/1 |
| 2023/0107711 A1* | 4/2023 | Crews, Jr. | G06Q 20/401 705/39 |
| 2023/0109761 A1* | 4/2023 | Hatter | H04L 9/3255 705/44 |
| 2023/0111784 A1* | 4/2023 | Yuki | G06Q 30/0631 705/26.7 |
| 2023/0113793 A1* | 4/2023 | Yuki | G06Q 10/083 705/44 |
| 2023/0123322 A1* | 4/2023 | Cella | G06Q 30/0202 700/29 |
| 2023/0128845 A1* | 4/2023 | Brodsky | G06Q 20/389 705/44 |
| 2023/0133569 A1* | 5/2023 | Kadry | G06Q 20/363 705/39 |
| 2023/0139465 A1* | 5/2023 | Nyati | G06N 5/02 706/59 |
| 2023/0145127 A1* | 5/2023 | Barnum | H04L 63/102 726/4 |
| 2023/0153830 A1* | 5/2023 | Frensch | H04L 9/3263 705/318 |
| 2023/0154222 A1* | 5/2023 | Desai | G06N 7/01 382/100 |
| 2023/0164570 A1* | 5/2023 | Khandare | H04W 12/63 726/6 |
| 2023/0173395 A1* | 6/2023 | Cella | G06N 3/09 463/25 |
| 2023/0176557 A1* | 6/2023 | Cella | G05B 23/024 700/117 |
| 2023/0177501 A1* | 6/2023 | Coughlan | G06Q 20/3825 705/75 |
| 2023/0184579 A1* | 6/2023 | Gettle | G06Q 20/208 |
| 2023/0186201 A1* | 6/2023 | Cella | G05B 19/41885 705/7.17 |
| 2023/0196230 A1* | 6/2023 | Cella | G06V 10/82 705/7.17 |
| 2023/0206329 A1* | 6/2023 | Cella | G06Q 20/3674 |
| 2023/0214841 A1* | 7/2023 | Ratnakaram | G06Q 20/405 705/44 |
| 2023/0214846 A1* | 7/2023 | Chetal | G06Q 20/407 705/64 |
| 2023/0214925 A1* | 7/2023 | Cella | G06Q 30/06 705/37 |
| 2023/0222454 A1* | 7/2023 | Cella | G06N 7/01 705/28 |
| 2023/0222531 A1* | 7/2023 | Cella | G06Q 10/06315 705/7.31 |
| 2023/0252548 A1* | 8/2023 | Kawase | G06F 21/32 705/14.27 |
| 2023/0281527 A1* | 9/2023 | Cella | G06V 20/17 705/7.17 |
| 2023/0298007 A1* | 9/2023 | Gupta | G06Q 20/3674 705/67 |
| 2023/0325814 A1* | 10/2023 | Vijayan | G06Q 20/3829 705/66 |
| 2023/0334491 A1* | 10/2023 | Leddy, III | G06Q 20/401 |
| 2023/0342679 A1* | 10/2023 | Wagenaar | G06Q 10/101 |
| 2023/0421377 A1* | 12/2023 | Jakobsson | H04L 9/50 |
| 2024/0005296 A1* | 1/2024 | Stankoulov | G06Q 20/363 |
| 2024/0005376 A1* | 1/2024 | Estes | G06Q 10/06398 |
| 2024/0013168 A1* | 1/2024 | Oei | G06Q 20/06 |
| 2024/0013177 A1* | 1/2024 | Sindi | G06Q 20/4016 |
| 2024/0013221 A1* | 1/2024 | Kruse | G06N 20/00 |
| 2024/0046318 A1* | 2/2024 | Muriqi | G06Q 20/389 |
| 2024/0118702 A1* | 4/2024 | Cella | G05B 19/4155 |
| 2024/0144141 A1* | 5/2024 | Cella | G06Q 10/06375 |

OTHER PUBLICATIONS

Patil et al "An Efficient, Secure and Delegable Micro-Payment System," Proceedings of the 2014 IEEE International Conference on e-Technology, e-Commerce and e-Service, IEEE Computer Society, pp. 1-11 (Year: 2004).*
Guo et al "Fraud Risk Monitoring System for E-Banking Transactions," 2018 IEEE 16th Int. Conf. on Dependable, Autonomic & Secure Comp., 16th Int. Conf on Pervasive Intelligence & Comp, 4th Int. Conf on Big Data Intelligence & Comp, and 3rd Cyber Sci & Tech Cong, IEEE Computer Society, pp. 100-105 (Year: 2018).*
Prasad et al Machine Learning Techniques to Detect Fraud in Credit Cards on the HPCC Systems Platform.*
Wu et al "Detecting in Situ Identity Fraud on Social Network Services: A Case Study with Facebook," IEEE Systems Journal, vol. 11. No: 4, pp. 2432-2443 (Year: 2015).*
Narhar et al "Highly Secure Authentication Scheme," 2015 International Conference on Computing Communication Control and Automation, IEEE Computer Society, pp. 270-274 (Year: 2015).*
Chukwoucha et al "Trust and Scalable Blockchain-Based Message Exchanging Scheme on Vanet," Springer, pp. 3092-3109 (Year: 2021).*
Cao et al "Using Machine Learning To Create a Credit Scoring Model in Banking and Finance," IEEE, pp. 1-5 (Year: 2021).*
Mohebali et al "An Evolutionary Framework for Real-Time Fraudulent Credit Detection," IEEE, pp. 1999-2006 (Year: 2021).*
Niu et al "A Real-Time Fraud Detection Algorithm Based on Intelligent Scoring for the Telecom Industry," IEEE, pp. 303-306 (Year: 2016).*
Boubker et al "A Comprehensive Study on Credit Card Fraud Prevention and Detection," IEEE, pp. 1-8 (Year: 2021).*

* cited by examiner

COMPUTER-IMPLEMENTED METHODS AND SYSTEMS FOR AUTHENTIC USER-MERCHANT ASSOCIATION AND SERVICES

FIELD OF THE INVENTION

The present disclosure generally relates to computer-implemented methods, systems comprising computer-readable media, and electronic devices for authentic user-merchant association and services.

BACKGROUND

Existing user-merchant association and services may be used for merchants to sell subscription services to users. Merchants often offer trial memberships to users, such that a user may test the trial membership prior to purchasing a full membership.

However, existing user-merchant association may be compromised by fraudulent users. For example, a fraudulent user may generate false and/or temporary methods of identification to fraudulently utilize a trial period of a subscription service multiple times and thereby avoid purchasing a full subscription service. Systems and methods for combatting fraudulent behavior are needed.

This background discussion is intended to provide information related to the present invention which is not necessarily prior art.

BRIEF SUMMARY

The following brief summary is provided to indicate the nature of the subject matter disclosed herein. While certain aspects of the present invention are described below, the summary is not intended to limit the scope of the present invention.

A first aspect of the invention concerns a system for identifying genuine user-merchant association. The system includes one or more processors and/or transceivers individually or collectively programmed to check the validity or expiration of a certificate from a device from which a request originates to create a certificate score, analyze previous communication from the device from which the request originates across a plurality of entities and regions to create a previous communication score, and conduct a messaging protocol check to create a protocol score. The one or more processors and/or transceivers are also programmed to output a weighted final score comprising a determination of whether to accept or deny the request based at least in part on one or more of the certificate score, the previous communication score, or the protocol score. The one or more processors and/or transceivers are also programmed to save the weighted final score.

A second aspect of the invention concerns a computer-implemented method for identifying genuine user-merchant association. The method includes checking the validity or expiration of a certificate from a device from which a request originates to create a certificate score. The method also includes analyzing previous communication from the device from which the request originates across a plurality of entities and regions to create a previous communication score. The method also includes conducting a messaging protocol check to create a protocol score. The method also includes outputting a weighted final score comprising a determination of whether to accept or deny the request based at least in part on one or more of the certificate score, the previous communication score, or the protocol score. The method also includes saving the weighted final score.

A third aspect of the invention concerns a computer-implemented method for identifying genuine user-merchant association. The method includes verifying that a telephone address by which a subscription request was submitted belongs to a telephone address carrier, to create a carrier association score. The method also includes analyzing source address information of at least one packet associated with the telephone address to create a source score. The method also includes sending to the telephone address a ping, wherein the ping enables the retrieval of identifying features of the telephone address, to create an identification score. The method also includes outputting a weighted final score comprising a determination of whether to accept or deny the request based at least in part on one or more of the carrier association score, the source score, or the identification score. The method also includes saving the weighted final score.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
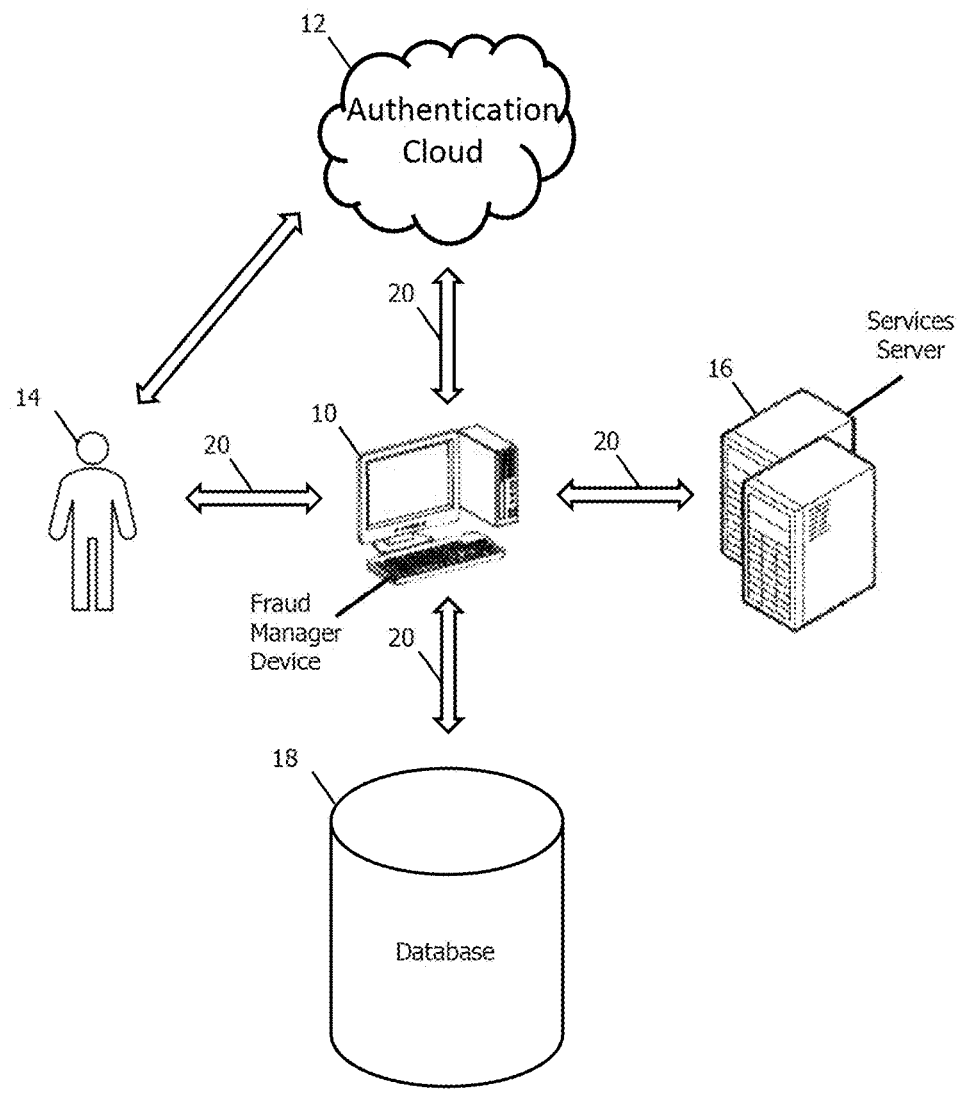
FIG. 1 illustrates, in schematic and block diagram form, an exemplary system including a fraud manager computing device for authentic user-merchant association and services according to the embodiments of the invention.

FIG. 1 depicts an exemplary system for authentic user-merchant association and services according to embodiments of the invention. The system may include a plurality of fraud manager computing devices 10, disposable authentication clouds 12, users 14, services servers 16, databases 18, and communication links 20. The fraud manager(s) 10 may comprise computing devices configured to process input and output from the disposable authentication cloud 12, user 14, services server 16, and database 18. The user 14 may be an individual attempting to exhaust a trial membership to a subscription service granted by the services server 16. The user may interface with the disposable authentication cloud 12 to obtain a randomly generated phone number, email address, or other means of online identification. The services server 16 may include a plurality of servers configured to grant or deny access to a trial membership for services (e.g., online services). Such services may relate to ecommerce, ride sharing services, online gaming memberships, or the like. The database 18 may be accessed by the fraud manager 10 and may be configured to store and provide or expose data related to a plurality of attempts to access a subscription service in which previous user(s) were denied access (e.g., by the fraud manager 10).

The fraud managers 10 and the services servers 16 may be located within network boundaries of a large organization, such as a service provider. The disposable authentication cloud 12 may be external to the organization, for example where fraudulent phone numbers or email addresses are generated in connection with accessing subscription services.

The fraud managers 10 may generally include tablet computers, laptop computers, desktop computers, workstation computers, smart phones, smart watches, and the like. In addition, fraud managers 10 may include servers.

Figure 2:
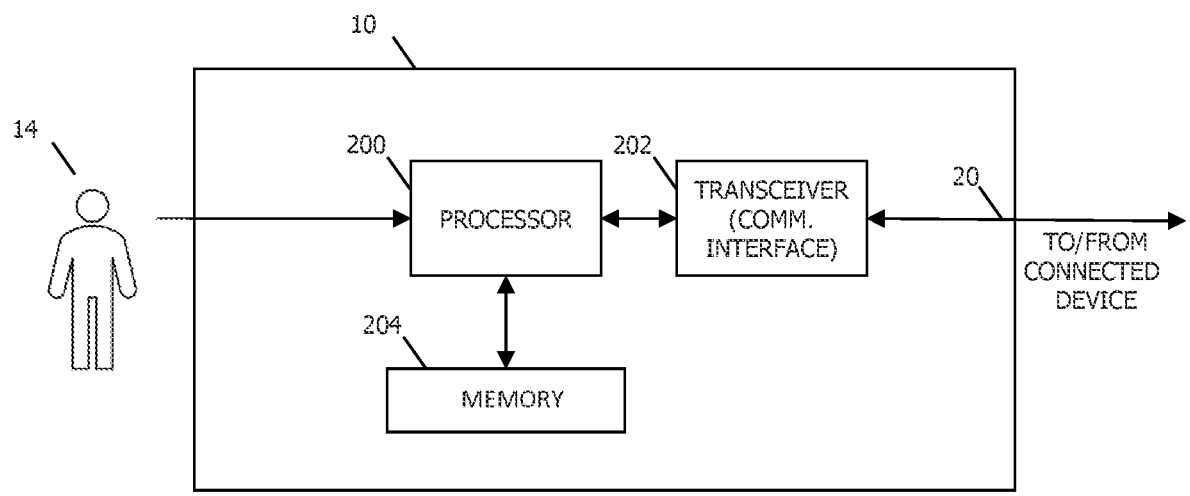
FIG. 2 illustrates various components of an exemplary fraud manager computing device shown in block schematic form that may be used with the system of FIG. 1.

Turning to FIG. 2, each fraud manager 10 may respectively include a processing element 200 and a memory element 204. Each fraud manager 10 may also respectively include circuitry capable of wired and/or wireless communication with the disposable authentication cloud 12, users 14, services servers 16, databases 18, and/or an external network via, for example, a transceiver element 202 and communication link 20. Further, the fraud managers 10 may respectively include a software program configured with instructions for performing and/or enabling performance of at least some of the steps set forth herein. In an embodiment, the software comprises programs stored on computer-readable media of memory element 204.

The services server 16 may include a plurality of proxy servers, web servers, communications servers, routers, load balancers, and/or firewall servers, as are commonly known.

The transceiver element 202 generally allows communication between the fraud managers 10 on the one hand and the services servers 16, databases 18, users 14 and the disposable authentication cloud 12 on the other hand. The transceiver element 202 may include signal or data transmitting and receiving circuits, such as antennas, amplifiers, filters, mixers, oscillators, digital signal processors (DSPs), and the like. The transceiver element 202 may establish communication via the communication links 20 wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the transceiver element 202 may utilize communication standards such as ANT, ANT+, Bluetooth™ low energy (BLE), the industrial, scientific, and medical (ISM) band at 2.4 gigahertz (GHz), or the like. Alternatively, or in addition, the transceiver element 202 may establish communication through the communication links 20. The communication links 20 may include connectors or couplers that receive metal conductor wires or cables, like Cat 6 or coax cable, which are compatible with networking technologies such as ethernet. In certain embodiments, the communication links 20 may also include optical fiber cables. The transceiver element 202 may respectively be in communication with the processing element 200 and/or the memory element 204, via the communication links 20.

The communication links 20 may include the Internet, cellular communication networks, local area networks, metro area networks, wide area networks, cloud networks, plain old telephone service (POTS) networks, and the like, or combinations thereof. The links 20 may be wired, wireless, or combinations thereof and may include components such as modems, gateways, switches, routers, hubs, access points, repeaters, towers, and the like. The links 20 may enable communication between one or more of the fraud managers 10, disposable authentication cloud 12, users 14, services servers 16, and databases 18. The communication links 20 may include wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The memory element 204 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 204 may be embedded in, or packaged in the same package as, the processing element 200. The memory element 204 may include, or may constitute, a "computer-readable medium." The memory element 204 may store the instructions, code, code segments, software, firmware, programs, applications, apps, services, daemons, or the like that are executed by the processing element 200. In an embodiment, the memory element 204 may respectively store the software applications/programs. The memory element 204 may also store settings, data, documents, sound files, photographs, movies, images, databases, and the like.

The processing element 200 may include electronic hardware components such as processors. The processing element 200 may include a digital processing unit. The processing element 200 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 200 may generally execute, process, or run instructions, code, code segments, software, firmware, programs, applications, apps, processes, services, daemons, or the like. For instance, the processing element 200 may respectively execute the software applications/programs. The processing element 200 may also include hardware components such as finite-state machines, sequential and combinational logic, and other electronic circuits that can perform the functions necessary for the operation of the current invention. The processing element 200 may be in communication with the other electronic components through serial or parallel links that include universal busses, address busses, data busses, control lines, and the like.

Through hardware, software, firmware, or various combinations thereof, the processing element 200 may—alone or in combination with other processing elements—be configured to perform the operations of embodiments of the present invention. Specific embodiments of the technology will now be described in connection with the attached drawing figures. The embodiments are intended to describe aspects of the invention in sufficient detail to enable those skilled in the art to practice the invention. Other embodiments can be utilized, and changes can be made without departing from the scope of the present invention. The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled.

Exemplary Method for Authentic User-Merchant Association and Services

Figure 3:
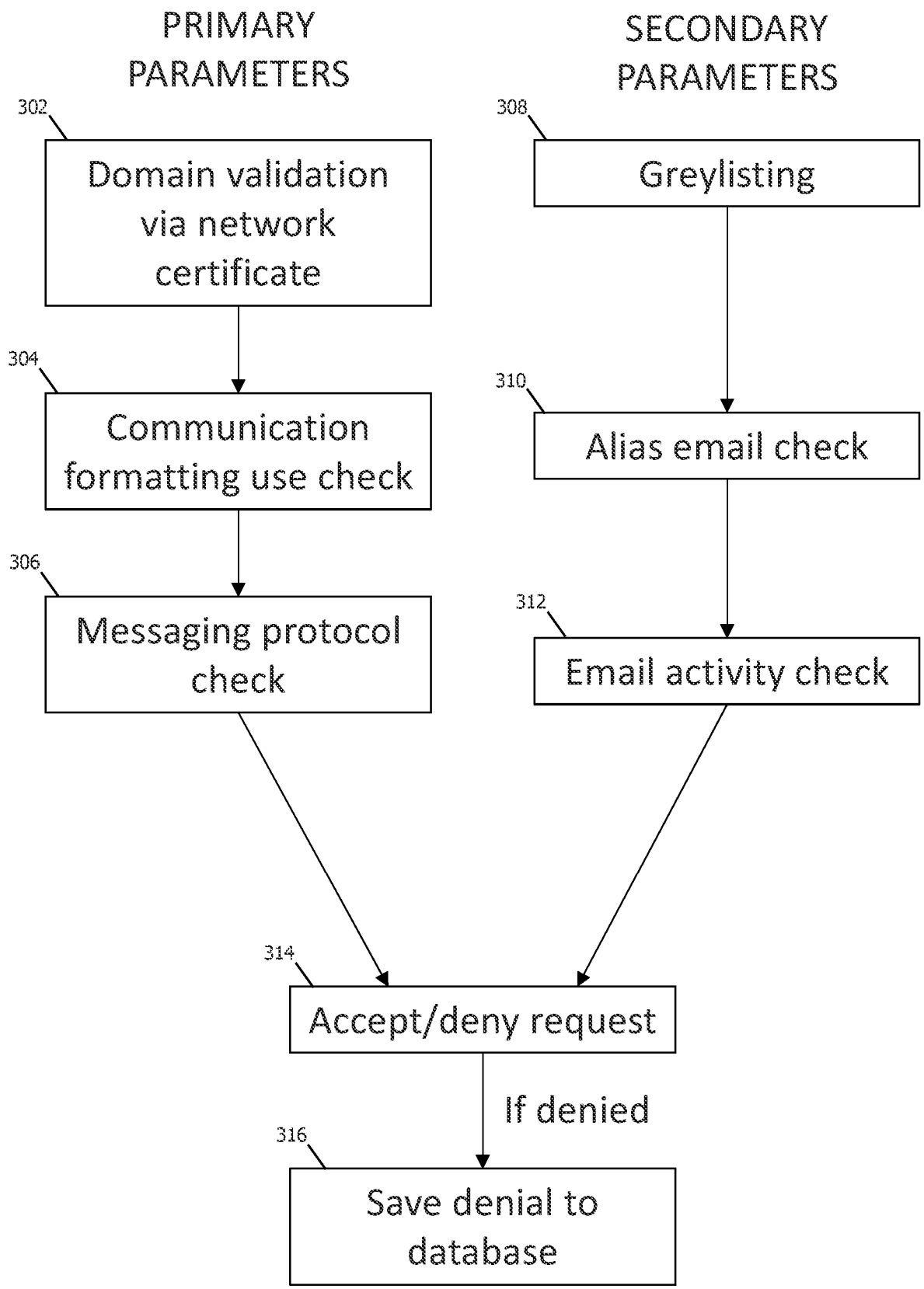
FIG. 3 is a flowchart illustrating at least a portion of the steps for running an email check service program in accordance with embodiments of the present invention.
Figure 4:
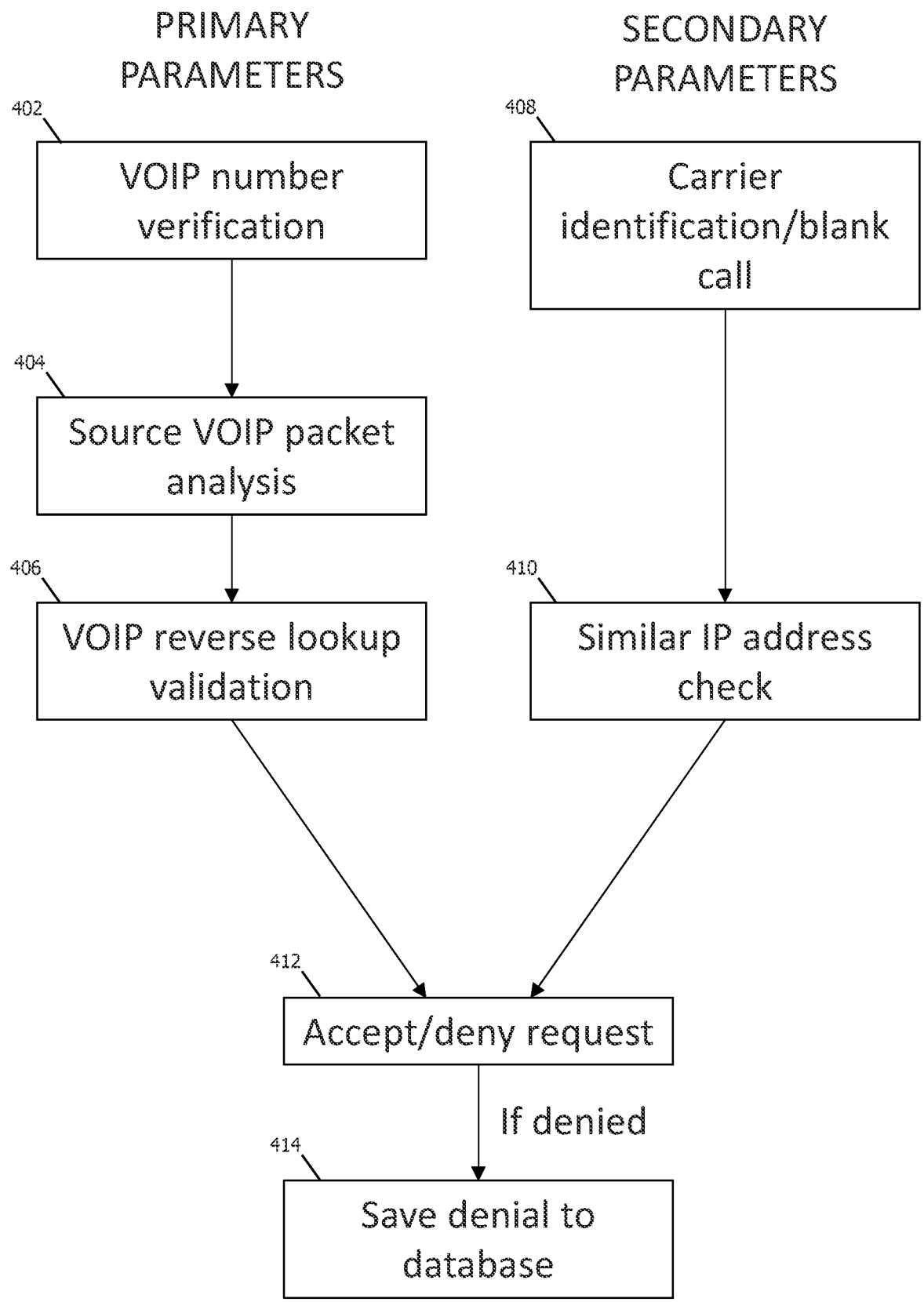
FIG. 4 is a flowchart illustrating at least a portion of the steps for running a mobile check service program in accordance with embodiments of the present invention.
Figure 5:
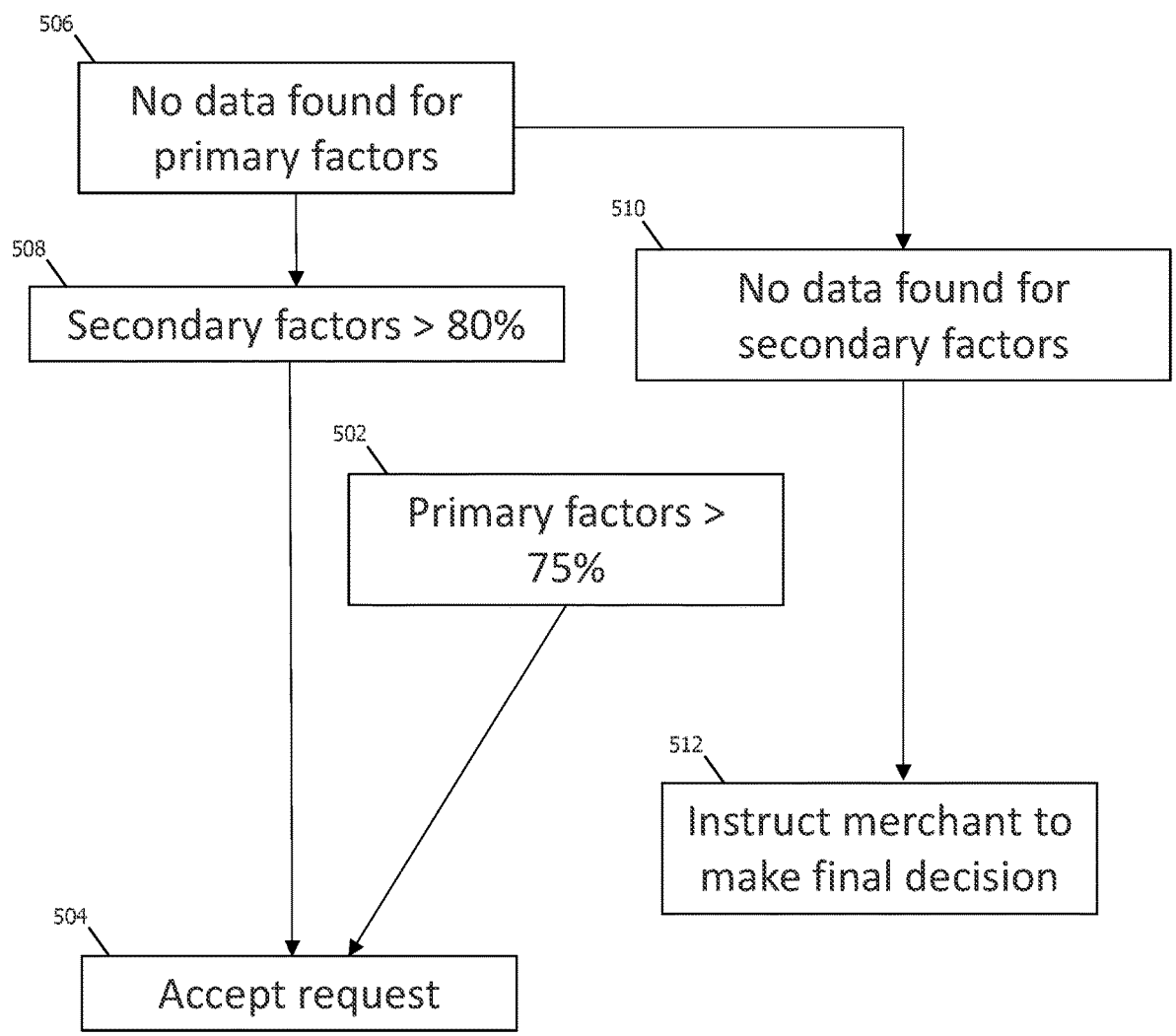
FIG. 5 is a flowchart illustrating at least a portion of the steps used for generating a score used in connection with determining whether to accept or deny a subscription service request in accordance with embodiments of the present invention.

FIGS. 3-5 depict block flow diagrams associated with exemplary computer-implemented method(s) for ensuring authentic user-merchant association and services. Some steps may be performed concurrently as opposed to sequentially and may in some cases be performed in a different order. In addition, some steps may be optional. The computer-implemented method(s) are described below, for ease of reference, as being executed by exemplary devices and components introduced with the embodiments illustrated in FIGS. 1 and 2. For example, the steps of the computer-implemented method(s) may be performed by the fraud managers 10, services servers 16, and databases 18 described above, at least in part through the utilization of processors, transceivers, hardware, software, firmware, or combinations thereof. In one or more embodiments, the steps set out below for a single fraud manager 10, services server 16, and database 18 are repeated in connection with the operation of a plurality of fraud managers 10, services servers 16, and databases 18 within the same general vicinity, at the same premises, or connected to a shared network. A person having ordinary skill will also appreciate that responsibility for all or some of such actions may be distributed differently among such devices or other computing devices without departing from the spirit of the present invention.

One or more computer-readable medium(s) may also be provided. The computer-readable medium(s) may include one or more executable programs, such as a controller program, stored thereon, wherein the program(s) instruct one or more processing elements to perform all or certain steps outlined herein. The program(s) stored on the computer-readable medium(s) may instruct the processing element(s) to perform additional, fewer, or alternative actions, including those discussed elsewhere herein.

Referring to FIG. 3, an email check service program may be executed to ensure authentic user-merchant association between a user and a subscription service. The email check service program may be stored and executed on a fraud manager computing device and may ensure an authentic user merchant association exists prior to the consumption of services provided by a subscription service. Likewise, the email check service program may detect fraudulent (non-authentic) user merchant association in order to deny a request for access to a subscription service, and/or may forward the request to a merchant (alone or in combination with a recommendation) such that the merchant may determine whether to accept or deny the request.

Steps 302-312 may be executed by or in connection with the email check service program. Step 302-306 may relate to primary parameters, and steps 308-312 may relate to secondary parameters. Referring more specifically to step 302, the email check service program conducts a domain validation via a network certificate. The email check service program may retrieve a network certificate from or in connection with a request for services and verify, either internally or via a third party, whether the network certificate is a valid network certificate and/or whether the network certificate has expired. The certificate may be an SSL/TSL certificate used in connection with an existing DNS. The DNS (domain name system) is the decentralized method to identify computers, services, and other resources reachable via the World Wide Web. The result(s) of step 302 may be taken into account by the email check service program. In one or more embodiments, the results of step 302 may be scored and weighted relative to other parameters of method 300 discussed in more detail below, e.g., at a weight of 20% relative to the other parameters. For example, a valid and unexpired network certificate from the request may be less indicative of fraud. In another example, an invalid or expired network certificate from the request may be more indicative of fraud.

Referring to step 304, the email check service program may conduct a communication formatting use check across multiple merchants and regions. Step 304 may include analyzing email headers and return paths of emails from an IP address associated with the request for services to determine whether the request deviated—for example, with respect to an expected pattern or one or more data elements—from prior requests created by the same IP address. The result(s) of step 304 may be taken into consideration by the email check service program. In one or more embodiments, the results of step 304 may be scored and weighted relative to other parameters of method 300 discussed in more detail elsewhere herein, e.g., at a weight of 20% relative to the other parameters. For example, consistently formatted headers and consistent return paths originating from the same IP address associated with a plurality of requests may be more indicative of fraud, with the indication of fraud increasing with the number of requests with such headers and return paths.

Referring to step 306, the email check service program may conduct a messaging protocol check. The messaging protocol check may include determining whether a server associated with the request is connected to the World Wide Web, determining whether a firewall is blocking communication from the associated server, determining whether the server associated with the request is allowing for the relaying of the particular domain used in requesting the service subscription, determining whether the server associated with the request is responding with an adequate hostname, and determining whether a connection to the server associated with the request works outside of the connection established with the email check service program. The result(s) of step 306 may be taken into consideration by the email check program. In one or more embodiments, the results of step 306 may be scored and weighted relative to other parameters of method 300 discussed in more detail elsewhere herein, e.g., at a weight of 20% relative to the other parameters. For example, a request passing the messaging protocol check may be less indicative of fraud. In another example, a request failing the messaging protocol check may be more indicative of fraud. As a request fails more of the aforementioned criteria listed in the messaging protocol check, the indication of fraud may also increase.

Referring to step 308, the email check service program may conduct host and domain greylisting. In connection with greylisting, the email check service program may temporarily reject an email from a sender that the email check service program does not recognize. If the email is legitimate, a server from which the email originated may attempt to send the email again after a sufficient delay.

In one or more embodiments, the actions in connection with greylisting may be conducted by a software application for describing, executing, and enabling the greylisting program sequences and communications, such as those used and transmitted, and made available under SPAMHAUS® (a registered trademark of the Spamhaus Project SLU), SPAMCO® (a registered trademark of Cisco Systems, Inc.), and URIBL® (a registered trademark of uribl.com) as of the date of initial filing of the present disclosure. One of ordinary skill will appreciate that the greylisting communication may be achieved according to other greylisting standards and technologies without departing from the spirit of the present invention. In one or more embodiments, the processing element 200 and communication element 202 may use signals corresponding to one or more greylisting standard(s) to process, route, connect, establish, or disconnect to and/or from other third-party devices when greylisting emails and requests.

The results of step 308 may be taken into consideration by the email check program. In one or more embodiments, the results of step 308 may be scored and weighted relative to other parameters of method 300 discussed in more detail elsewhere herein, e.g., at a weight of 20% relative to the other parameters. For example, a subsequent request may be more indicative of fraud if the subsequent request matches the format of a temporarily rejected request.

Referring to step 310, the email check service program may conduct an alias email check to determine whether an email address from which a request for access to the subscription service originated is registered as an alias email address for one or more other email addresses that have either exhausted the trial period of the subscription service, have been denied access to the subscription service, and/or have been blacklisted from the subscription service. The result of step 310 may be taken into consideration by the email check program. In one or more embodiments, the results of step 310 may be scored and weighted relative to other parameters of method 300 discussed in more detail elsewhere herein, e.g., at a weight of 10% relative to the other parameters. For example, a request is more indicative of fraud if the request is registered as an alias email address for the one or more email addresses that have either exhausted the trail period of the subscription service, have been denied access to the subscription service, and/or have been blacklisted from the subscription service.

Referring to step 312, the email check service program may conduct an email activity check. The email activity check may include determining the number of emails received in a pre-determined span of time immediately prior to receiving an email from the email address requesting access to the subscription service. The result of step 312 may be taken into consideration by the email check program. In one or more embodiments, the results of step 312 may be scored and weighted relative to other parameters of method 300 discussed in more detail elsewhere herein, e.g., at a weight of 10% relative to the other parameters. For example, a request may be more indicative of fraud if a higher volume of requests were received in the pre-determined span of time.

Referring to step 314, the email check service program may generate a weighted final score based at least in part on the results of steps 302-312. The weighted final score may be used to accept or deny the subscription service request, depending on, for example, a threshold of the corresponding merchant or service provider for accepting or denying requests. Also, or alternatively, the weighted final score may help the merchant or service decide whether the corresponding user is allowed to be associated with the subscription service in the future.

Referring to step 316, the email check service program may store any combination of scores or denials to a database, along with identifying features of the request (e.g., the email address, the user, and other identifying information). The database may store any score and denial among other scores and denials in the database such that the database may enable searches for all previous scores and denials during a future subscription service request from an unknown email address or otherwise utilize the data to inform similar determinations.

Referring to FIG. 4, a mobile check service program may be executed to ensure authentic user-merchant association between a user and a subscription service. The mobile check service program may be stored and executed on a fraud manager computing device and may ensure an authentic user merchant association exists prior to the consumption of services provided by a subscription service. Likewise, the mobile check service program may detect fraudulent (non-authentic) user merchant association in order to deny a request for subscription service use, and/or may forward the request to a merchant (alone or in combination with a recommendation and/or the results of steps 302-312 discussed above), such that the merchant may determine whether to accept or deny the request.

Steps 402-410 may be used in connection with the mobile check service program. Step 402-406 may relate to primary parameters, and steps 408-410 may relate to secondary parameters. Referring to step 402, the mobile check service program may conduct a voice over internet protocol (VOIP) telephone address verification. As part of the VOIP telephone address verification, the mobile check service program may identify telephone addresses commonly associated with a plurality of carriers to determine whether the telephone address requesting a subscription service is similar to the telephone addresses commonly associated with the plurality of carriers.

In one or more embodiments, the mobile check service program may run an API in connection with step 402. The API may include authentication measures and callouts used and transmitted in accordance with standards put forth by Vonage Holdings Corporation under the marks Vonage Communications API™ and VERIFY API™. One of ordinary skill will appreciate that the mobile number verification conducted by the API may be achieved according to other standards and technologies without departing from the spirit of the present invention. In one or more embodiments, the processing element 200 and communication element 202 may use signals corresponding to one or more mobile number verification standard(s) to process, route, connect, establish, or disconnect to and/or from other third-party devices when verifying mobile numbers. The result(s) of step 402 may be taken into consideration by the mobile check service program. In one or more embodiments, the results of step 402 may be weighted relative to other parameters of method 400 discussed in more detail elsewhere below, e.g., at a weight of 25% relative to the other parameters. For example, a telephone address found to be associated with a carrier may be less indicative of fraud. In another example, a telephone address found not to be associated with a carrier may be more indicative of fraud.

Referring to step 404, the mobile check service program may analyze packets associated with the VOIP telephone address for source IP address and validation of the IP address of the VOIP number for fraud association. The result of step 404 may be taken into consideration by the mobile check service program. In one or more embodiments, the results of step 404 may be weighted relative to other parameters of method 400 discussed in more detail elsewhere herein, e.g., at a weight of 20% relative to the other parameters. For example, packets from a request originating from a flagged IP address may be more indicative of fraud.

Referring to step 406, the mobile check service program may verify a caller ID associated with the telephone address requesting a subscription service. To verify the caller ID, the mobile check service program may send to the carrier network associated with the telephone address requesting a subscription service a ping in order to retrieve a calling name value. The calling name value may be named information tied to a telephone address and may display on devices that receive a call from the telephone address. Additionally, the calling name value may indicate a geographical location of the telephone address, and the carrier network associated with the telephone address. The sequences in connection with step 406 may include authentication measures and callouts used and transmitted in accordance with standards put forth by IPQualityScore LLC or Searchbug. One of ordinary skill will appreciate that the mobile number verification conducted by the API may be achieved according to other standards and technologies without departing from the spirit of the present invention. In one or more embodiments, the processing element 200 and communication element 202 may use signals corresponding to one or more telephone address verification standard(s) to process, route, connect, establish, or disconnect to and/or from other third-party devices when verifying telephone addresses. The result(s) of step 406 may be taken into consideration by the mobile check service program. In one or more embodiments, the results of step 406 may be weighted relative to other parameters of method 400 discussed in more detail elsewhere herein, e.g., at a weight of 25% relative to the other parameters. For example, a request with a calling name value outside of a geographical region approved for subscription services may be more indicative of fraud. In another example, a request with a calling name value including the name of a previously identified fraudulent user may be more indicative of fraud. In another example, a calling name value with a telephone address of a previously identified fraudulent user may be more indicative of fraud.

Referring to step 408, the mobile check service program may identify the carrier associated with the telephone address requesting a subscription service. To identify the carrier, the mobile check service program may call the telephone address for a predetermined duration of time. In one or more embodiments, audio from the mobile check service program to the telephone address may be muted. The mobile check service program may listen for and/or record, during the predetermined duration of time, audible feedback from the call. The result of step 408 may be taken into consideration by the mobile check service program. In one or more embodiments, the results of step 408 may be weighted relative to other parameters of method 400 discussed in more detail elsewhere herein, e.g., at a weight of 15% relative to the other parameters. For example, no feedback from the call may be more indicative of fraud. In another example, feedback from the call may be more indicative of fraud if the feedback does not include a standardized dial tone. In another example, feedback from the call may be more indicative of fraud if the feedback includes a message indicating that a verified user is not associated with the telephone address from which the request originates.

Referring to step 410, the mobile check service program may search for similar telephone addresses with slight variations from those either stored in the database or previously submitted to the subscription service in question. The result of step 410 may be taken into consideration by the mobile check service program. In one or more embodiments, the results of step 410 may be weighted relative to other parameters of method 400 discussed in more detail elsewhere herein, e.g., at a weight of 15% relative to the other parameters. For example, a telephone address is more indicative of fraud if the telephone address from which the request originates contains single-digit variations from those either stored in the database or previously submitted to the subscription service, with the indication of fraud decreasing with more variations of single digits.

Referring to step 412, the mobile check service program may generate a weighted final score based at least in part on the results of step 402-410. The weighted final score may be used to accept or deny the subscription service request depending on, for example, a threshold of the corresponding merchant or service provider for accepting or denying requests. Also, or alternatively, the weighted final score may help the merchant or service decide whether the corresponding user is allowed to be associated with the subscription service in the future.

Referring to step 414, the mobile check service program may store a denial to a database, along with identifying features of the request (e.g., the email address, the user, and other identifying information). The database may store the denial among other denials in the database such that the database may search for all previous denials during a future subscription service request from an unknown email address, or otherwise utilize the data to inform similar determinations.

Turning now to FIG. 5, an AI model may be used, executed and/or implemented by the fraud manager 10 noted above to generate a score, wherein the score may indicate whether a subscription service request should be accepted or denied. The score may include an aggregation of primary and secondary factors between an email check service program and/or a mobile check service program.

Referring to step 502, the AI model may inquire into whether the percentages of the primary factors are greater than 75%. If the percentages of the primary factors added together are greater than 75%, the AI model may immediately accept the subscription request in step 504 without further action.

Referring to step 506, the AI model may determine that the fraud manager computing device could not locate data for the primary factors, i.e., that all primary factor scores for the email check service program and/or the mobile check service program are unavailable. If the AI model finds that no data was found for the primary factors, the AI model may accept the request in step 504 if the secondary factors are greater than 80%, as determined pursuant to step 508. Alternatively, the AI model may, after step 506, determine that the fraud manager computing device could not locate data for the secondary factors in step 510. In that case, the AI model may instruct the merchant to make the final decision regarding the acceptance or denial of the subscription in step 512 (e.g., without the benefit of a recommendation or result from the AI model).

The preferred forms of the invention described above are to be used as illustrations only and should not be utilized in a limiting sense in interpreting the scope of the present invention. Obvious modifications to the exemplary embodiments, as hereinabove set forth, could be readily made by those skilled in the art without departing from the spirit of the present invention.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by the inventor(s) includes the following:

1. A system for identifying genuine user-merchant association, the system comprising one or more processors and/or transceivers individually or collectively programmed to:
   check the validity or expiration of a network certificate associated with a request to create a certificate score, the request being from a user and for access to a trial subscription service of a merchant;
   analyze previous communication from the user from which the request originates across a plurality of entities and regions to create a previous communication score, the analysis including a determination that multiple previous communications from the user embody a consistent header formatting and a common internet protocol (IP) address, the previous communication score reflecting higher fraud likelihood for consistent header formatting of the multiple previous communications from the common IP address, the consistency being indicative of attempted repeated fraudulent utilization of the trial subscription service;
   conduct a messaging protocol check for a server associated with the request to create a protocol score, the messaging protocol check including and the protocol score being based on one or more of the following factors—firewall of the server associated with the request, relay of a domain associated with the request by the server associated with the request, response with a hostname by the server associated with the request, or connection with the server associated with the request that is outside an established connection;
   temporarily reject an unrecognized request to create an unrecognized request score;
   output a weighted final score comprising a determination of whether to accept or deny the request based at least in part on the unrecognized request score and on one or more of the certificate score, the previous communication score, and the protocol score, the weighted final score incorporating a weighting toward denying the request based on the determination of the consistent header formatting and the common IP address; and
   based on the determination of whether to accept or deny the request, generate a corresponding recommendation to the merchant to accept or deny the request from the user.

2. The system of claim 1, the one or more processors and/or transceivers being further individually or collectively programmed to determine whether an identity from which the request originates is not associated with a plurality of previously rejected requests to create a previous rejection score, wherein the weighted final score is further based at least in part on the previous rejection score.

3. The system of claim 1, the one or more processors and/or transceivers being further individually or collectively programmed to determine, within a preset period of time, activity performed on the account from which the request originates to create an activity score, wherein the weighted final score is further based at least in part on the activity score.

4. The system of claim 1, wherein the system—
   accepts the request if the weighted final score of the request is within a threshold of weighted final scores the merchant has configured to accept the request, or
   denies the request if the weighted final score of the request is outside a threshold of weighted final scores the merchant has configured to accept the request.

5. The system of claim 1, the one or more processors and/or transceivers being further individually or collectively programmed to pass the decision to accept or deny the request to the merchant.

6. The system of claim 1, wherein the weighted final score is saved in a manner suited for retrieval and use in analyzing a plurality of future requests.

7. A computer-implemented method for identifying genuine user-merchant association, the method comprising:
   checking the validity or expiration of a network certificate associated with a request to create a certificate score, the request being from a user and for access to a trial subscription service of a merchant;
   analyzing previous communication from the user from which the request originates across a plurality of entities and regions to create a previous communication score, the analysis including a determination that multiple previous communications from the user embody a consistent header formatting and a common internet protocol (IP) address, the previous communication score reflecting higher fraud likelihood for consistent header formatting of the multiple previous communications from the common IP address, the consistency being indicative of attempted repeated fraudulent utilization of the trial subscription service;
   conducting a messaging protocol check for a server associated with the request to create a protocol score, the messaging protocol check including and the protocol score being based on one or more of the following factors—firewall of the server associated with the request, relay of a domain associated with the request by the server associated with the request, response with a hostname by the server associated with the request, or connection with the server associated with the request that is outside an established connection;

temporarily rejecting an unrecognized request to create an unrecognized request score;

outputting a weighted final score comprising a determination of whether to accept or deny the request based at least in part on the unrecognized request score and on one or more of the certificate score, the previous communication score, and the protocol score, the weighted final score incorporating a weighting toward denying the request based on the determination of the consistent header formatting and the common IP address; and based on the determination of whether to accept or deny the request, generate a corresponding recommendation to the merchant to accept or deny the request from the user.

8. The computer-implemented method of claim 7, the method further comprising temporarily rejecting an unrecognized request to create an unrecognized request score, wherein the weighted final score is further based at least in part on the unrecognized request score.

9. The computer-implemented method of claim 8, wherein after temporarily rejecting the unrecognized request, the method allows for the reception of the unrecognized request after a sufficient delay.

10. The computer-implemented method of claim 7, the method further comprising determining whether an identity from which the request originates is not associated with a plurality of previously rejected requests to create a previous rejection score, wherein the weighted final score is further based at least in part on the previous rejection score.

11. The computer-implemented method of claim 7, the method further comprising determining, within a preset period of time, activity performed on the account from which the request originates to create an activity score, wherein the weighted final score is further based at least in part on the activity score.

12. The computer-implemented method of claim 7, the method further comprising accessing the weighted final score for a plurality of future requests, such that the method can more easily identify genuine user-merchant association.

13. Non-transitory computer-readable storage media having computer-executable instructions for identifying genuine user-merchant association stored thereon, wherein when executed by at least one processor the computer-executable instructions cause the at least one processor to:

check the validity or expiration of a network certificate associated with a request to create a certificate score, the request being from a user and for access to a trial subscription service of a merchant;

analyze previous communication from the user from which the request originates across a plurality of entities and regions to create a previous communication score, the analysis including a determination that multiple previous communications from the user embody a consistent header formatting and a common internet protocol (IP) address, the previous communication score reflecting higher fraud likelihood for consistent header formatting of the multiple previous communications from the common IP address, the consistency being indicative of attempted repeated fraudulent utilization of the trial subscription service;

conduct a messaging protocol check for a server associated with the request to create a protocol score, the messaging protocol check including and the protocol score being based on one or more of the following factors—firewall of the server associated with the request, relay of a domain associated with the request by the server associated with the request, response with a hostname by the server associated with the request, or connection with the server associated with the request that is outside an established connection;

temporarily reject an unrecognized request to create an unrecognized request score;

output a weighted final score comprising a determination of whether to accept or deny the request based at least in part on the unrecognized request score and on one or more of the certificate score, the previous communication score, and the protocol score, the weighted final score incorporating a weighting toward denying the request based on the determination of the consistent header formatting and the common IP address; and based on the determination of whether to accept or deny the request, generate a corresponding recommendation to the merchant to accept or deny the request from the user.

14. The non-transitory computer-readable storage media of claim 13, wherein when executed by the at least one processor the computer-executable instructions cause the at least one processor to determine whether an identity from which the request originates is not associated with a plurality of previously rejected requests to create a previous rejection score, wherein the weighted final score is further based at least in part on the previous rejection score.

15. The non-transitory computer-readable storage media of claim 13, wherein when executed by the at least one processor the computer-executable instructions cause the at least one processor to determine, within a preset period of time, activity performed on the account from which the request originates to create an activity score, wherein the weighted final score is further based at least in part on the activity score.

16. The non-transitory computer-readable storage media of claim 13, wherein when executed by the at least one processor the computer-executable instructions cause the at least one processor— accept the request if the weighted final score of the request is within a threshold of weighted final scores the merchant has configured to accept the request, or deny the request if the weighted final score of the request is outside a threshold of weighted final scores the merchant has configured to accept the request.

17. The non-transitory computer-readable storage media of claim 13, wherein when executed by the at least one processor the computer-executable instructions cause the at least one processor to pass the decision to accept or deny the request to the merchant.

18. The non-transitory computer-readable storage media of claim 13, wherein the weighted final score is saved in a manner suited for retrieval and use in analyzing a plurality of future requests.

\* \* \* \* \*